US012709103B2

(12) United States Patent
Ogawa et al.

(10) Patent No.: US 12,709,103 B2
(45) Date of Patent: Aug. 18, 2026

(54) LIQUID EJECTION HEAD

(71) Applicant: CANON KABUSHIKI KAISHA, Tokyo (JP)

(72) Inventors: Motohiro Ogawa, Kanagawa (JP); Yumi Komamiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/390,120

(22) Filed: Dec. 20, 2023

(65) Prior Publication Data

US 2024/0208239 A1 Jun. 27, 2024

(30) Foreign Application Priority Data

Dec. 23, 2022 (JP) ................................. 2022-207132

(51) Int. Cl.
*B41J 2/185* (2006.01)
*B41J 2/14* (2006.01)

(52) U.S. Cl.
CPC ........... *B41J 2/185* (2013.01); *B41J 2/14201* (2013.01)

(58) Field of Classification Search
CPC ...... B41J 2/185; B41J 2/14201; B41J 2/1404; B41J 2/175; B41J 2/18
See application file for complete search history.

(56) References Cited

U.S. PATENT DOCUMENTS 11,155,090 B2 * 10/2021 Okubo ................... B41J 2/1429

FOREIGN PATENT DOCUMENTS

JP 2020-142379 A 9/2020

* cited by examiner

*Primary Examiner* — Lisa Solomon
(74) *Attorney, Agent, or Firm* — Venable LLP

(57) ABSTRACT

A liquid ejection head includes a first printing element substrate, a second printing element substrate, and a liquid supply member. The liquid supply member includes a distribution channel arranged upstream of the first printing element substrate and the second printing element substrate and a collection channel arranged downstream of the first printing element substrate and the second printing element substrate. In the distribution channel, a first distribution opening and a second distribution opening are arranged in series manner to be arrayed in the order as listed from an inlet opening. In the collection channel, a first collection opening and a second collection opening are arranged parallel to each other to be connected with an outlet opening by way of a branch point. In the collection channel, a flow resistance between the first collection opening and the branch point is lower than a flow resistance between the second collection opening and the branch point.

15 Claims, 29 Drawing Sheets

LIQUID EJECTION HEAD

BACKGROUND OF THE INVENTION

Field of the Invention

The present disclosure relates to a liquid ejection head mounted on a liquid ejection printing apparatus.

Description of the Related Art

An ink jet type printing head that ejects an ink droplet may be a representative example of a liquid jet head that ejects a liquid. As disclosed in Japanese Patent Laid-Open No. 2020-142379 (hereinafter, referred to as PTL 1), the ink jet type printing head commonly has a configuration in which an ejection module, which includes a printing element substrate in which an ejection port to eject a liquid and a pressure chamber communicating with the ejection port are formed, is joined to a channel member, which supplies the printing element substrate with ink.

For example, in PTL 1, since the length of a channel leading to the pressure chamber in each printing element substrate differs between the printing element substrates, a pressure loss in the channel is uneven between the printing element substrates. For this reason, there is the possibility that the pressure of the ink in the pressure chamber in the printing element substrate is uneven between the printing element substrates. Therefore, there is the possibility that the droplet formation by the ejected ink is uneven, and the deterioration in the image quality is caused.

SUMMARY OF THE DISCLOSURE

One aspect of the present disclosure is directed to a liquid ejection head including: a first printing element substrate that includes a plurality of first ejection ports that eject a liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction; a second printing element substrate that includes a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively, and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows, in which in the distribution channel, the first distribution opening and the second distribution opening are arranged in series manner so as to be arrayed in the order as listed from the inlet opening, in the collection channel, the first collection opening and the second collection opening are arranged parallel to each other so as to be connected with the outlet opening by way of a branch point, and in the collection channel, a flow resistance between the first collection opening and the branch point is lower than a flow resistance between the second collection opening and the branch point.

Further features of the present disclosure will become apparent from the following description of exemplary embodiments with reference to the attached drawings.

DESCRIPTION OF THE EMBODIMENTS

Examples of embodiments of the present disclosure are described below with reference to the drawings. Note that the descriptions below are not intended to limit the scope of the present disclosure. Although a method of ejecting a liquid by driving a piezoelectric element is employed in the present embodiment as an example, it is possible to apply the present disclosure also to a liquid ejection head employing a thermal method by which the liquid is ejected by an air bubble generated by a heater element and other various liquid ejection methods.

The present embodiment is an ink jet printing apparatus (a printing apparatus) in a mode of circulating the liquid such as ink between a tank and the liquid ejection head; however, another mode may be applicable. For example, a mode in which the ink is not circulated, and two tanks are provided upstream and downstream of the liquid ejection head, respectively, to flow the ink from one tank to the other tank so as to flow the ink in a pressure chamber may be applicable.

Figure 1:
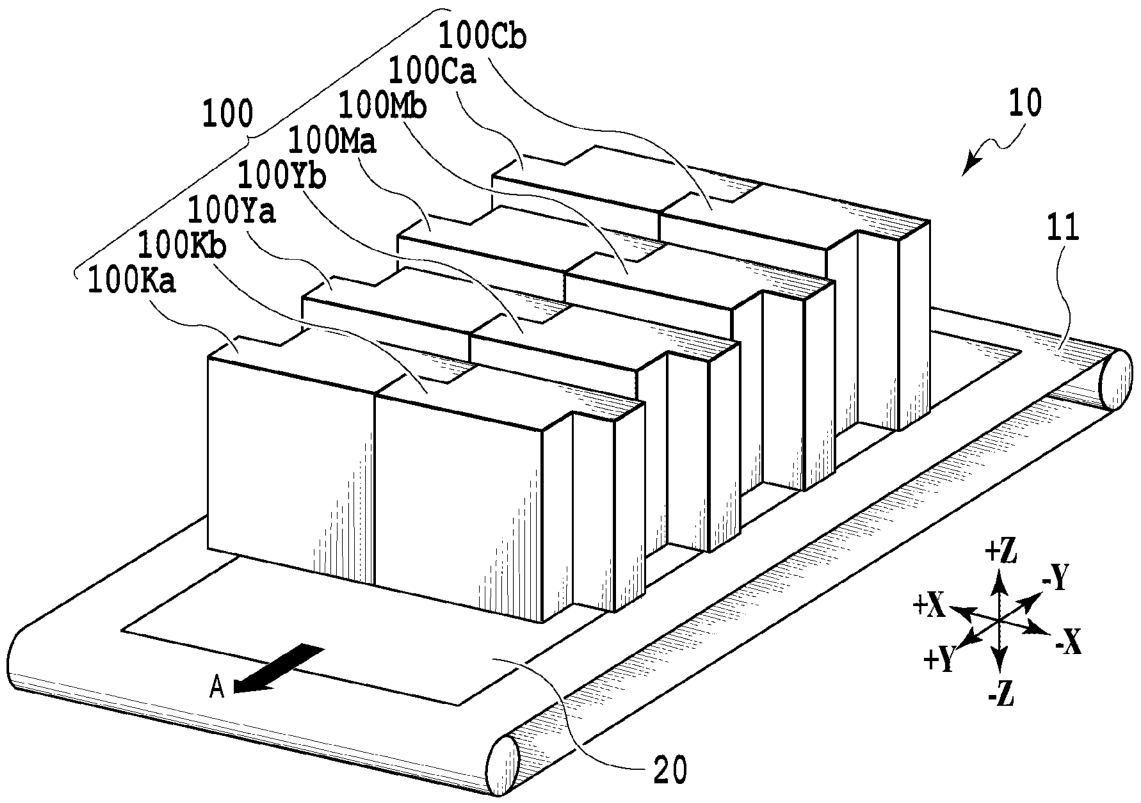
FIG. 1 is a perspective view of a printing apparatus according to an embodiment.

FIG. 1 is an example of the printing apparatus that is a one-pass type to print an image on a printing medium with one movement of the printing medium and that includes nozzles arrayed over a side corresponding to an entire width of a printing medium 20. The printing medium 20 is conveyed in a direction of an arrow A by a conveyance unit 11, and printing is performed by a liquid ejection head 100. The liquid ejection head according to the present disclosure is also applicable to a printing apparatus other than the printing apparatus of a mode illustrated in FIG. 1.

Figure 2:
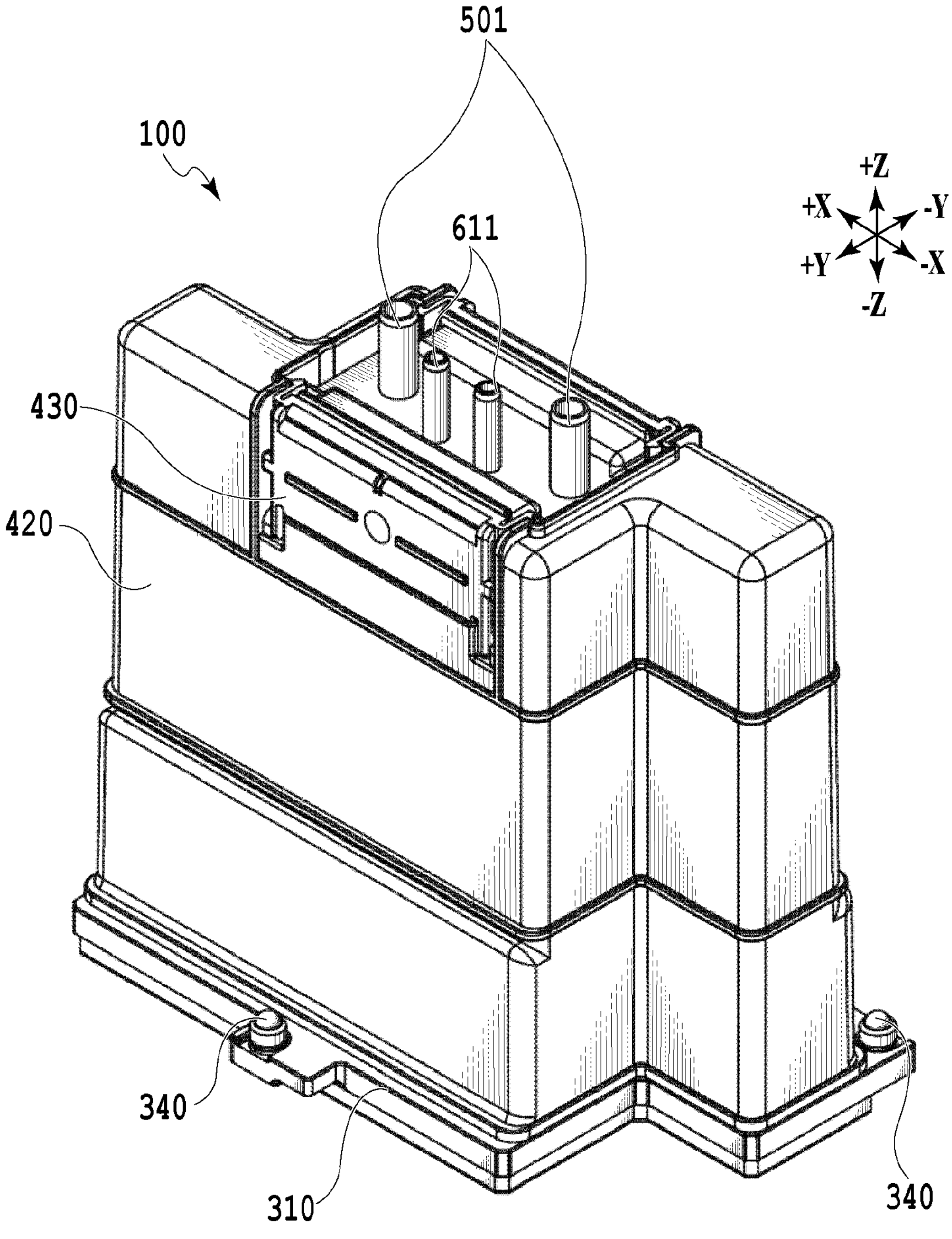
FIG. 2 is a perspective view of a liquid ejection head according to a first embodiment.
Figure 3:
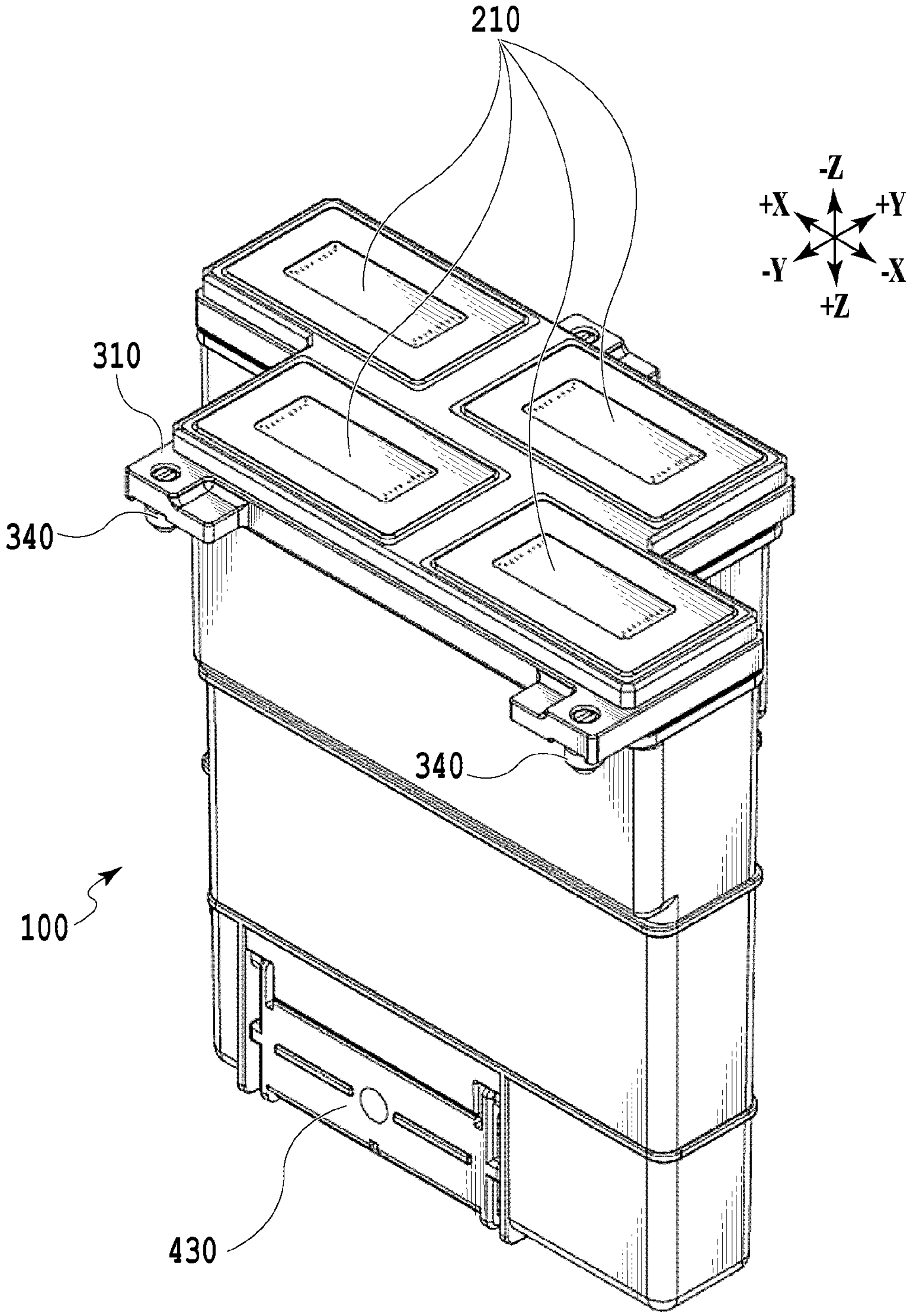
FIG. 3 is a perspective view of the liquid ejection head according to the first embodiment that is viewed from an ejection surface side.
Figure 4:
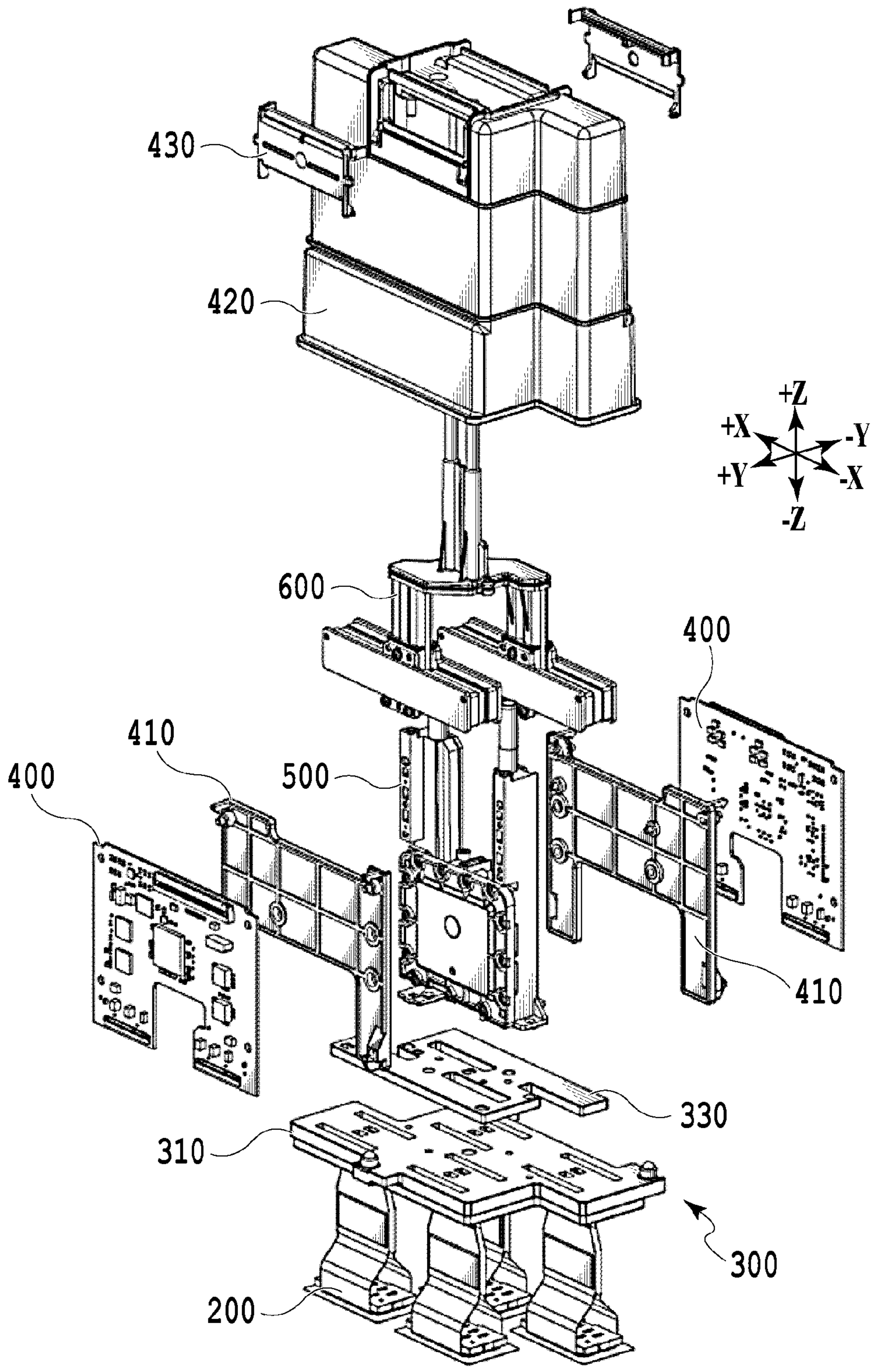
FIG. 4 is an exploded perspective view of the liquid ejection head according to the first embodiment.

A configuration of the liquid ejection head 100 according to the first embodiment is described. FIGS. 2 and 3 are perspective views of the liquid ejection head 100 according to the present embodiment, and FIG. 4 is an exploded perspective view thereof.

With reference to FIG. 2, the liquid ejection head 100 is positioned in the printing apparatus by fixing a main support member 310 on the printing apparatus with a reference member 340. With reference to FIG. 3, the liquid ejection head 100 has a configuration in which four printing element substrates 210 that can eject liquid are arranged in a staggered manner on the main support member 310. Referring back to FIG. 2, a liquid connection unit 501 and a refrigerant connection unit 611 are provided on a top portion of the liquid ejection head 100 (a portion on the opposite side from the side including the main support member 310). With the connection of the liquid connection unit 501 and the refrigerant connection unit 611 to a liquid supply unit and a refrigerant supply unit on a printing apparatus side, respectively, the inside of the liquid ejection head 100 is supplied with the liquid such as ink and a refrigerant. Additionally, with reference to FIG. 2, the liquid ejection head 100 also includes a cover member 420 and an electric connection unit cover member 430 as a head exterior that cover an electric substrate, an electric connection unit, and the like for protection. With reference to FIG. 4, the liquid ejection head 100 includes inside a support unit 300 that includes a main support member 310, an electric wiring substrate 400, and a sub-support member 410 that supports the electric wiring substrate 400. Additionally, the liquid ejection head 100 also includes inside a liquid supply unit 500 that supplies a liquid ejection unit 200 with the liquid through the support unit 300 and a cooling unit 600 that cools down a driving circuit substrate 251 (see FIG. 5).

A configuration of each unit of the liquid ejection head 100 is described below in detail.

Figure 5:
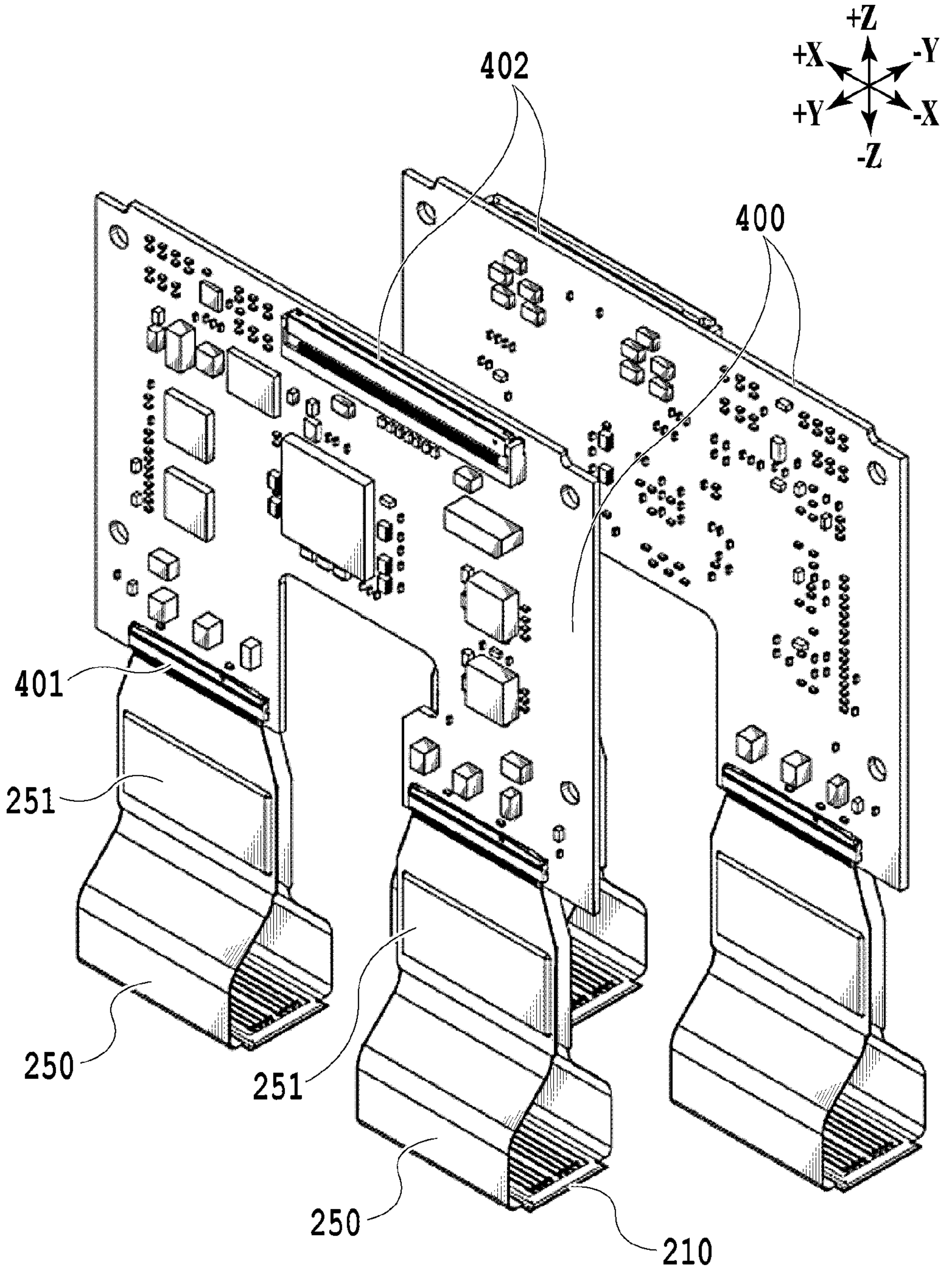
FIG. 5 is a perspective view illustrating an electric connection configuration of the liquid ejection head according to the first embodiment.

FIG. 5 is an electric connection configuration diagram of the liquid ejection head 100 according to the present embodiment.

With reference to FIG. 5, the printing apparatus and the printing element substrate 210 are electrically connected to each other through a flexible wiring substrate 250 and the electric wiring substrate 400. The electric wiring substrate 400 is electrically connected with a control unit on the printing apparatus side by an electric connection terminal 402 and supplies the printing element substrate 210 with an ejection driving signal and power required for the ejection. The electric wiring substrate 400 and the flexible wiring substrate 250 are electrically connected to each other through an electric connection unit 401. Wirings are concentrated by an electric circuit in the electric wiring substrate 400, and thus the terminal number of the electric connection terminals 402 can be less than the terminal number of the ejection element substrates 210. Therefore, there are few electric connection units that need to be detached in a case of assembling the liquid ejection head 100 on the printing apparatus or in a case of replacing the liquid ejection head.

Figure 6:
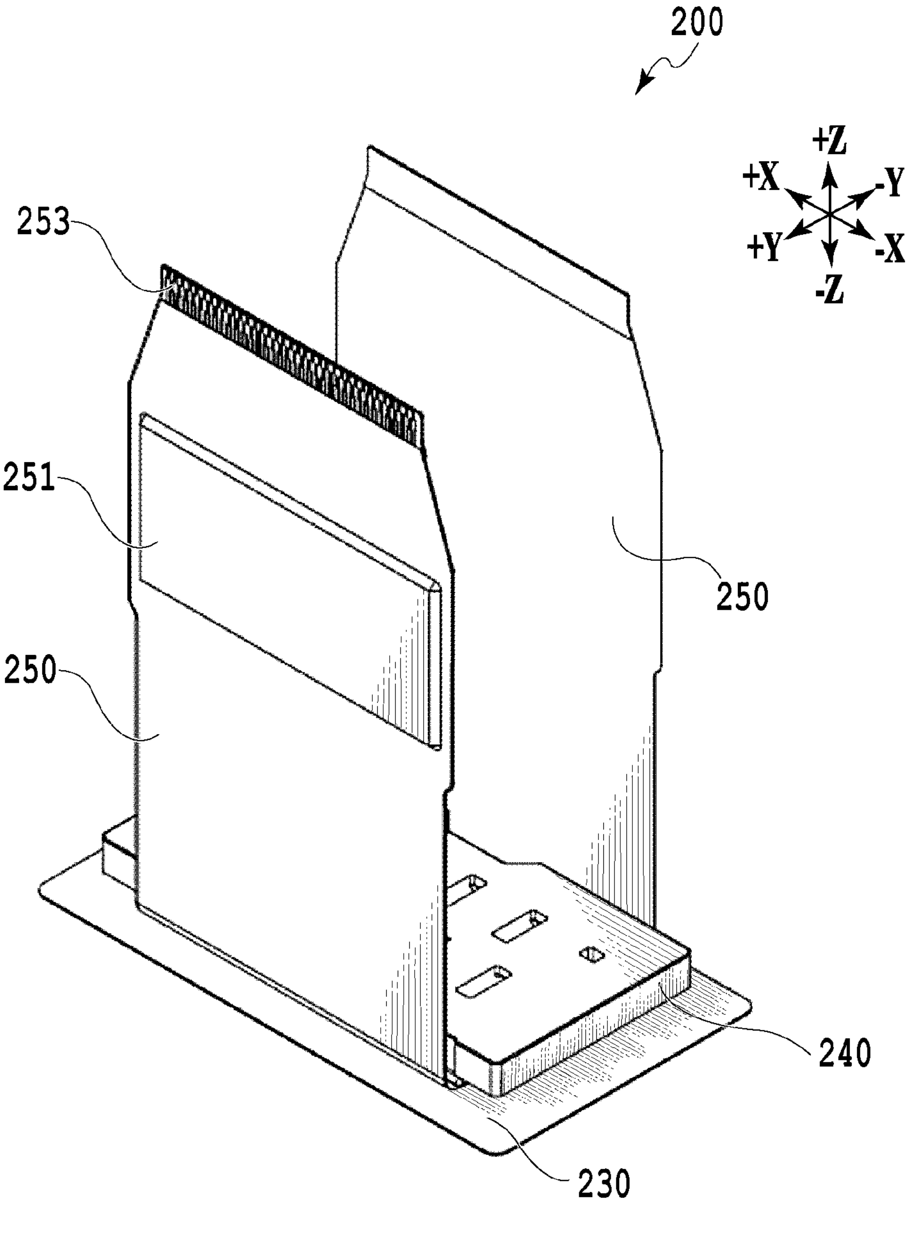
FIG. 6 is a perspective view of a liquid ejection unit according to the first embodiment.
Figure 7:
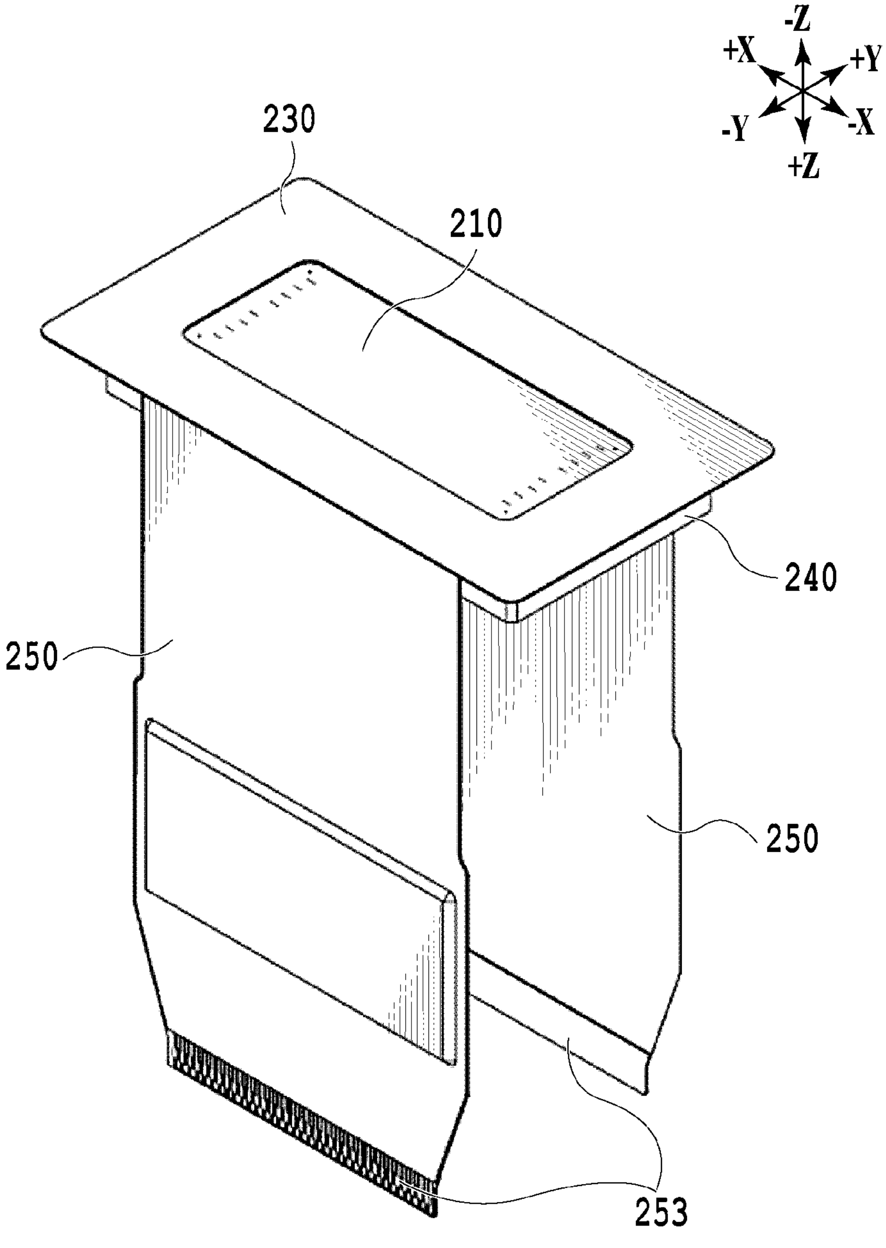
FIG. 7 is a perspective view of the liquid ejection unit according to the first embodiment that is viewed from the ejection surface side.
Figure 8:
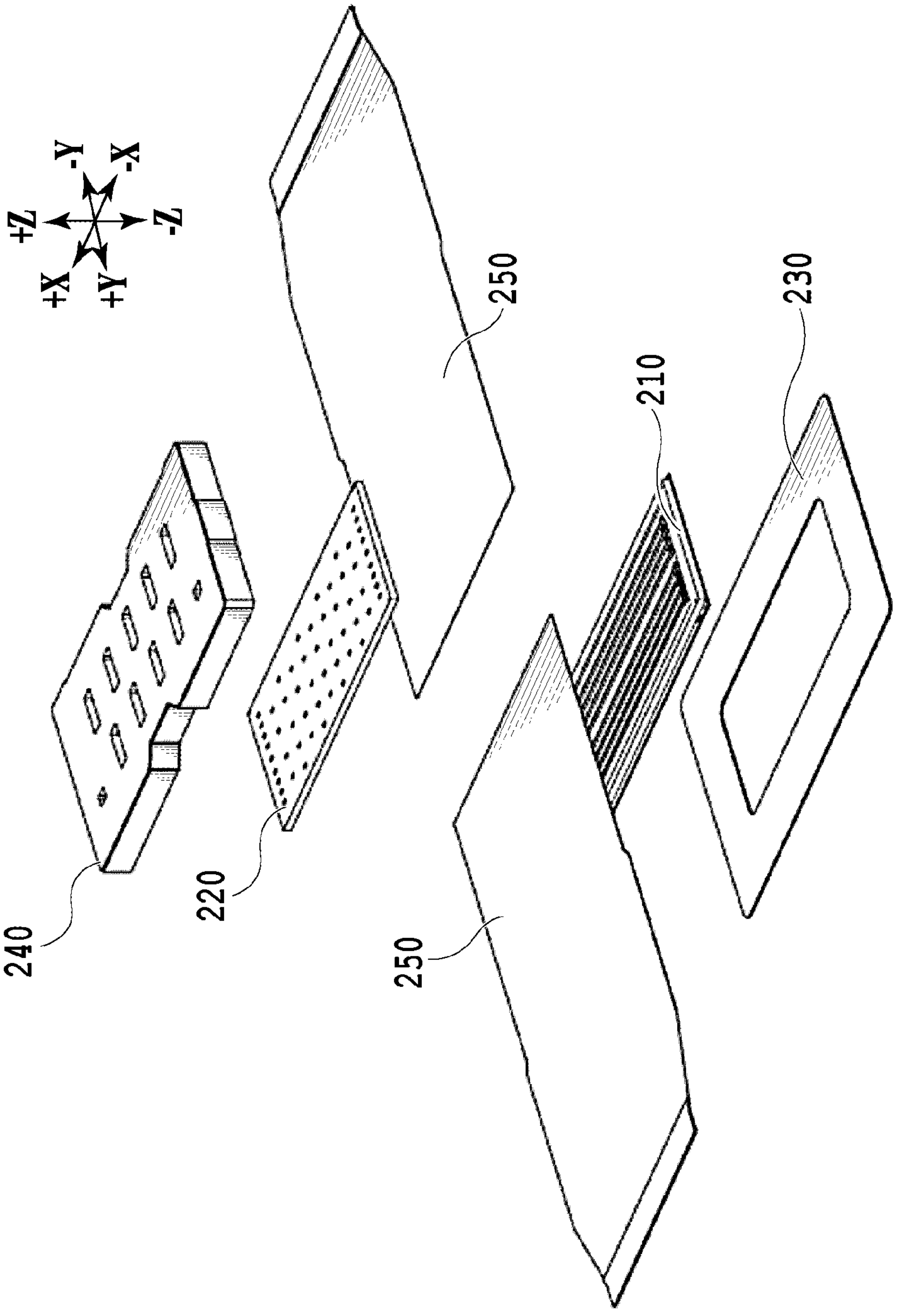
FIG. 8 is an exploded view of the liquid ejection unit according to the first embodiment.
Figure 9:
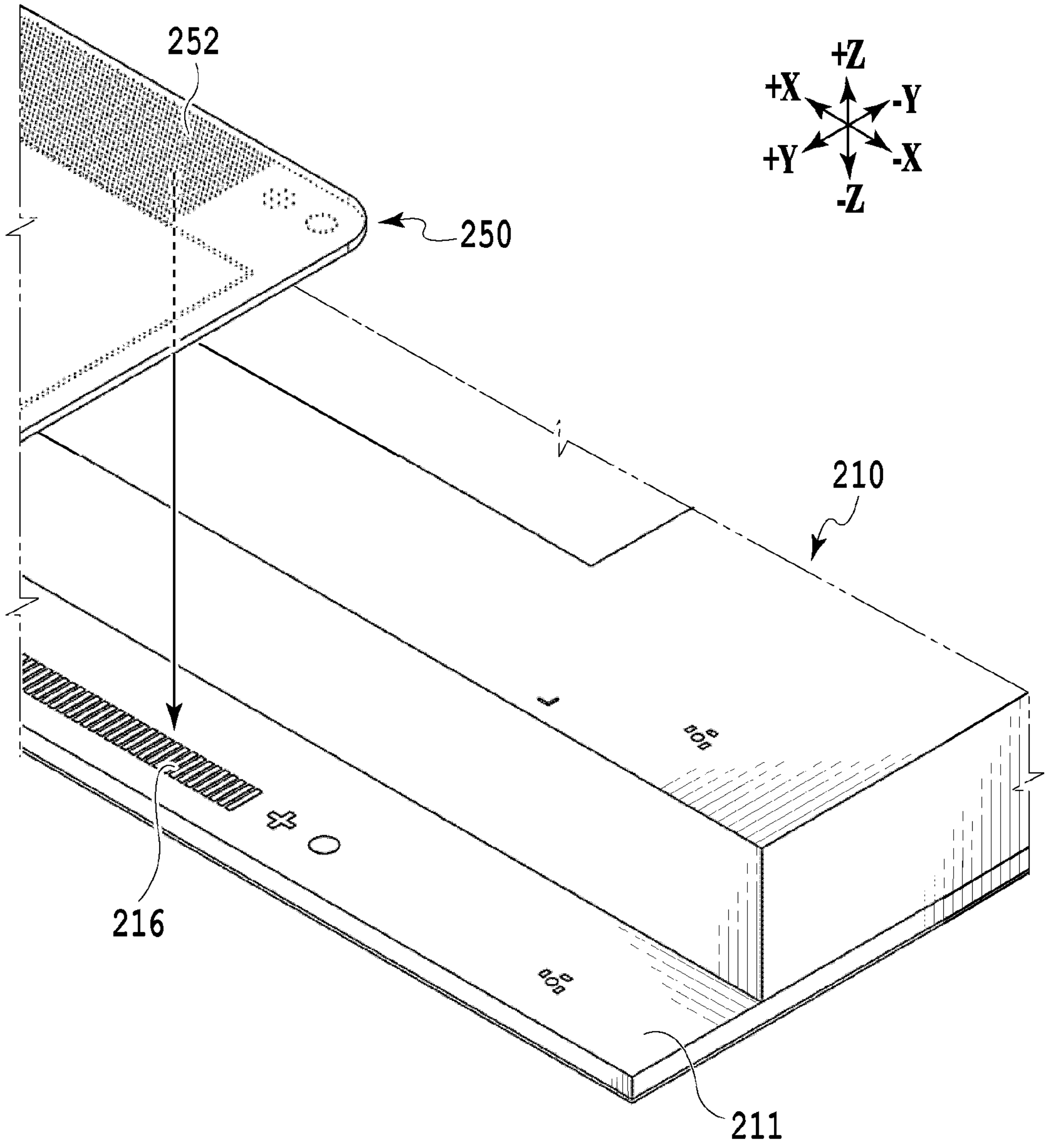
FIG. 9 is an enlarged perspective view of an electrode unit of the liquid ejection unit according to the first embodiment of the present disclosure.

FIGS. 6 and 7 are perspective views of the liquid ejection unit 200, and FIG. 8 is an exploded perspective view of the liquid ejection unit 200. The liquid ejection unit 200 includes the printing element substrate 210 that ejects the liquid, a substrate side channel member 220 that supplies the printing element substrate 210 with the liquid, and a supply system side channel member 240. Additionally, the liquid ejection unit 200 includes the flexible wiring substrate 250 that is electrically connected with the printing element substrate 210, and a substrate support member 230 that is joined to an ejection surface side of the printing element substrate 210. With reference to FIG. 9, an electrode unit 216 is provided on a thin plate unit 211 at each of two end portions of the printing element substrate 210. With a contact between each electrode of the electrode unit 216 and each electrode of a first electric connection unit 252 of the flexible wiring substrate 250, the printing element substrate 210 and the flexible wiring substrate 250 are electrically connected to each other. In order to prevent the liquid penetration into the first electric connection unit 252 and to reinforce the thin plate unit 211 of the printing element substrate 210, the substrate support member 230 is joined to an ejection surface side of the thin plate unit 211. The driving circuit substrate 251 (see FIG. 5) that drives a printing element of the printing element substrate 210 is provided on the flexible wiring substrate 250.

Figure 10:
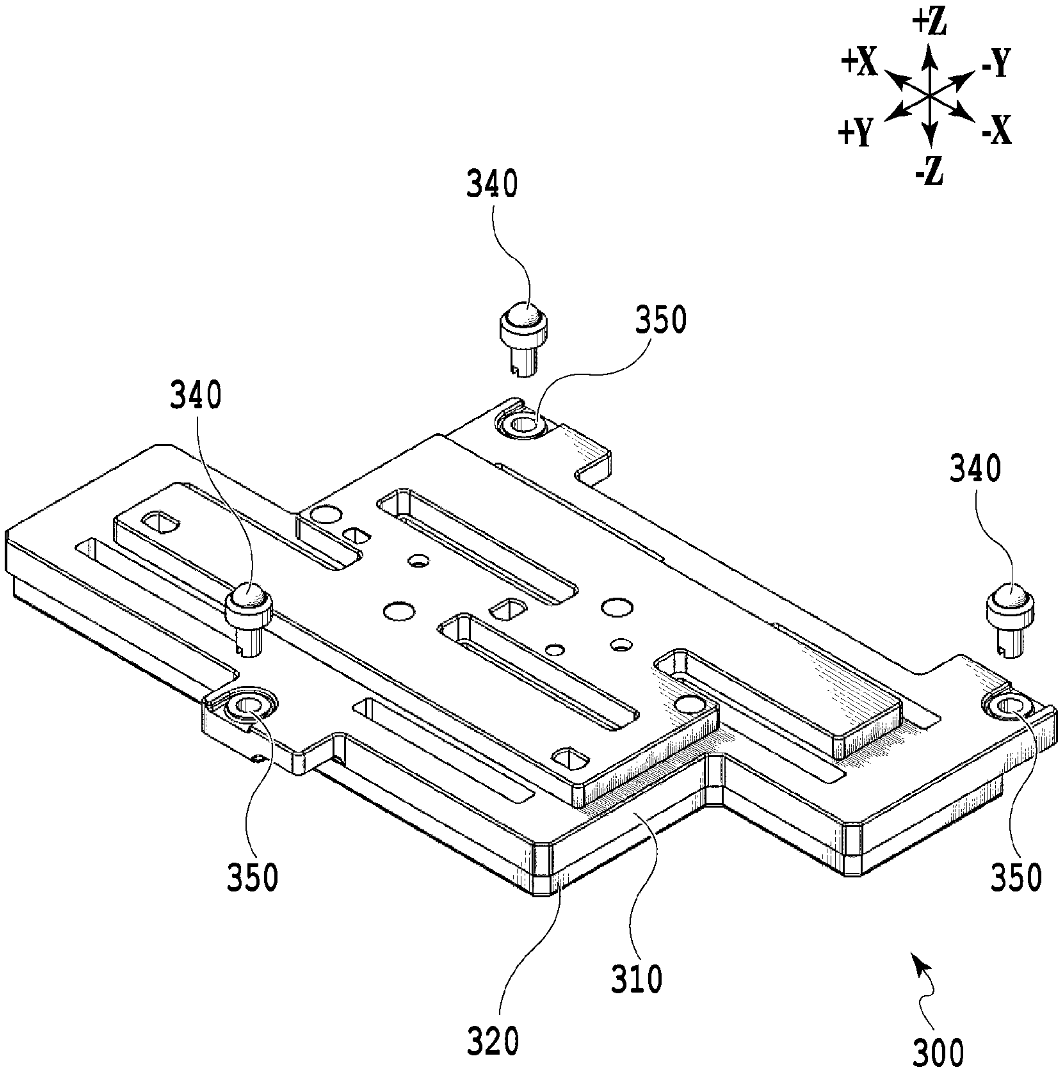
FIG. 10 is a perspective view of a support unit of the liquid ejection head according to the first embodiment.

FIG. 10 is a perspective view of the support unit 300 that supports the liquid ejection unit 200. The support unit 300 includes the main support member 310 to which the liquid ejection unit 200 is joined, and a frame body member 320 surrounding the liquid ejection unit 200. Additionally, the support unit 300 includes a liquid supply member 330 in which a channel to supply each liquid ejection unit 200 with the liquid through the main support member 310 is formed, and the reference member 340 having a function of the positioning to the printing apparatus. Moreover, the support unit 300 also includes a reference fixation member 350 that fixes the reference member 340 in the main support member 310. For example, the main support member 310, the frame body member 320, and the liquid supply member 330 are preferably formed of the same material with consideration for thermal expansion of the members in a case where a temperature is adjusted to heat the ink or in a case where an environment is varied. Alternatively, in a case where the main support member 310, the frame body member 320, and the liquid supply member 330 are formed of different types of materials, linear expansion coefficients thereof are preferably as close to each other as possible. This makes it possible to suppress the deformation of the whole support unit in the thermal expansion and the deterioration in a position accuracy of the printing element substrate 210 along with the deformation.

Figure 11:
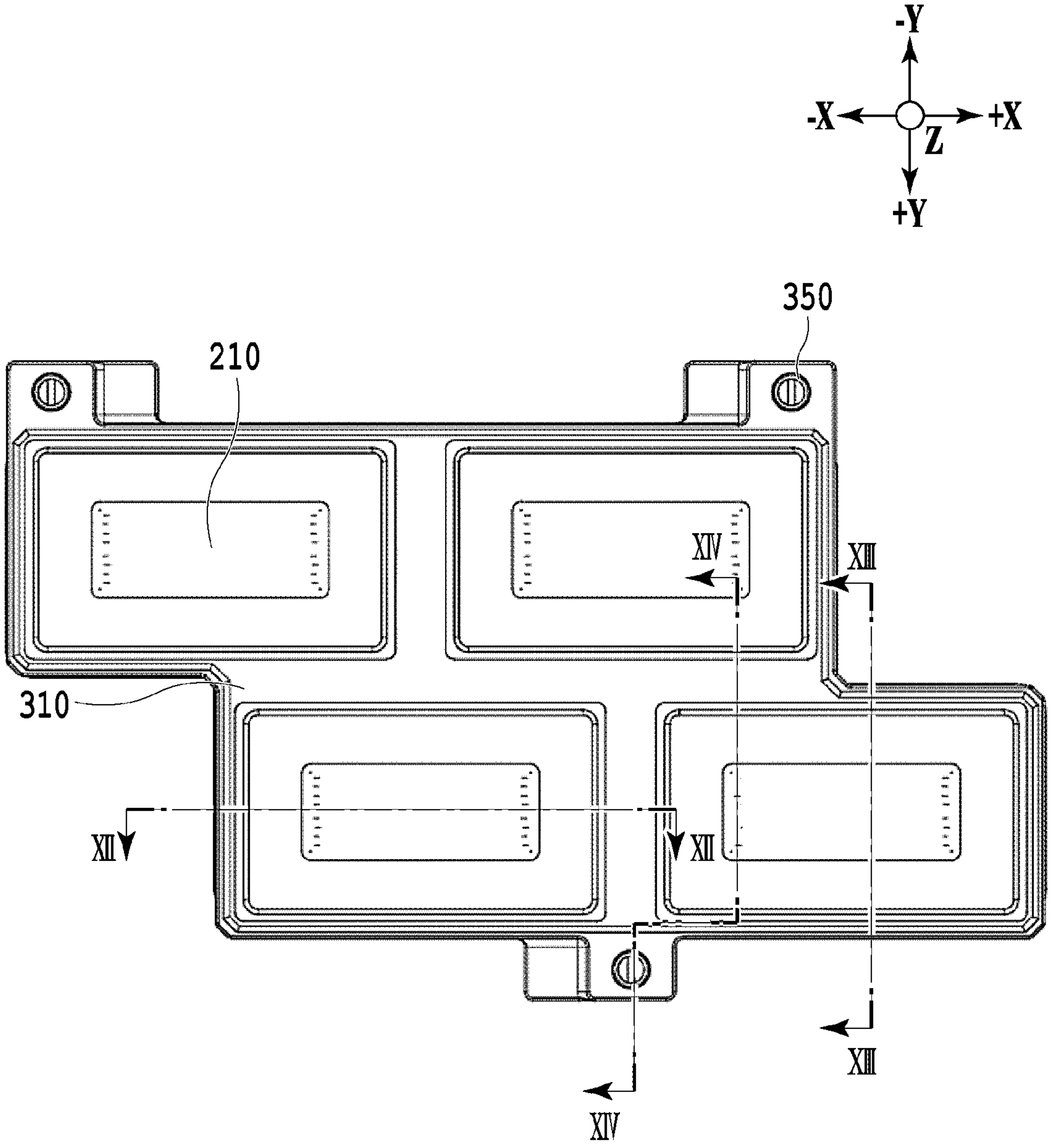
FIG. 11 is a plan view of the ejection surface side of the liquid ejection head according to the first embodiment.
Figure 12:
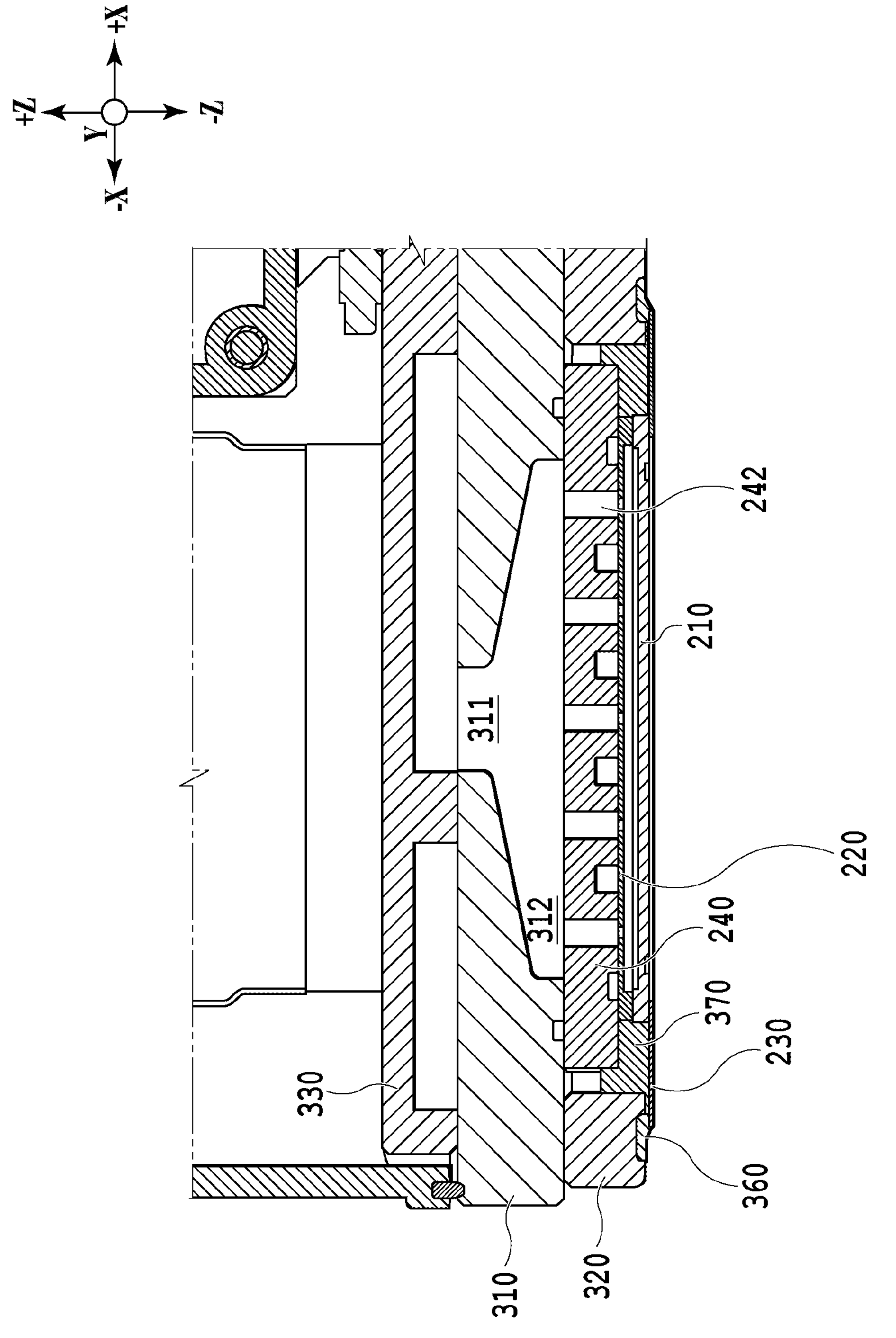
FIG. 12 is a XII-XII cross-sectional view of the liquid ejection unit shown in FIG. 11 according to the first embodiment.
Figure 13:
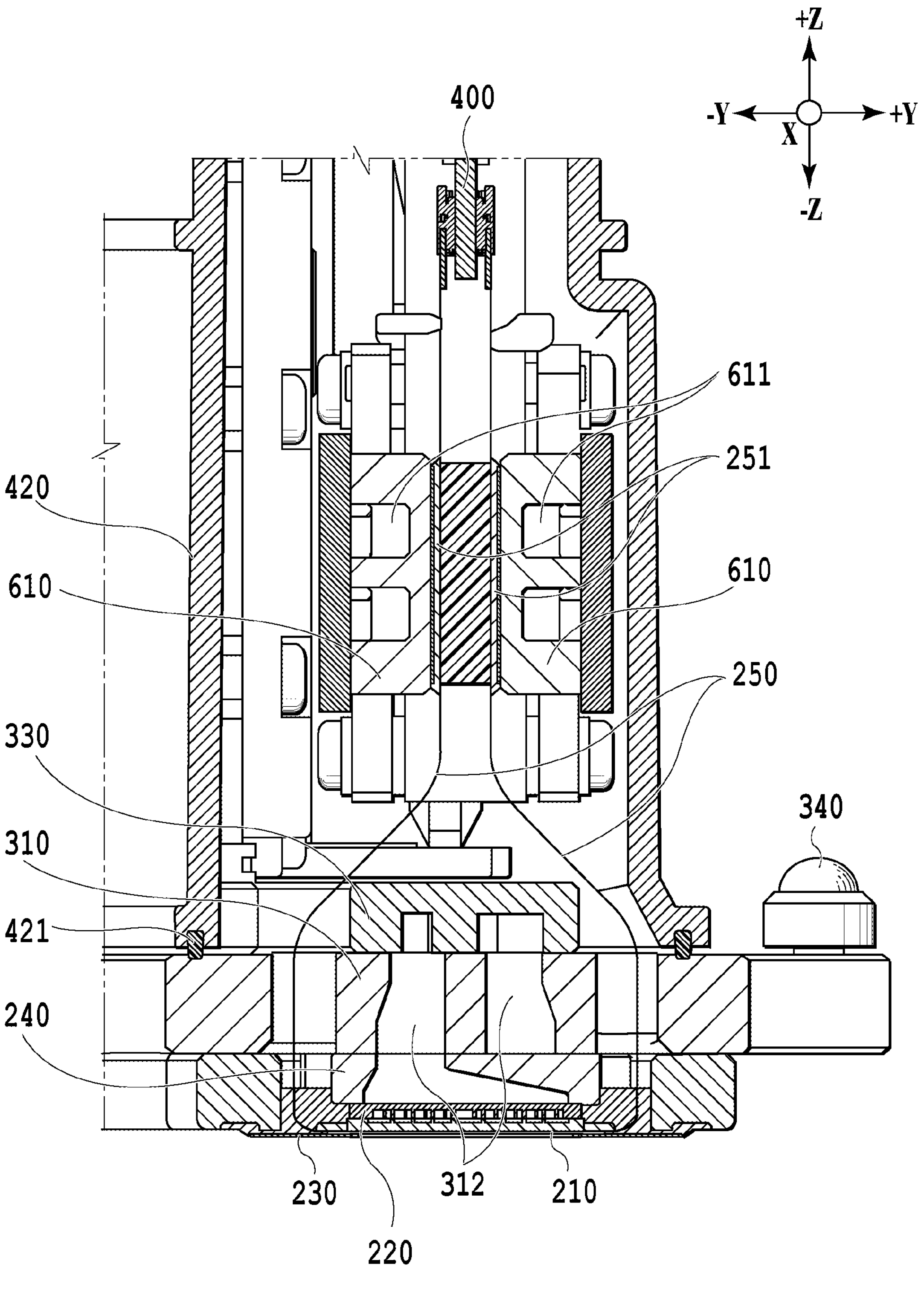
FIG. 13 is a XIII-XIII cross-sectional view of the liquid ejection head shown in FIG. 11 according to the first embodiment.
Figure 14:
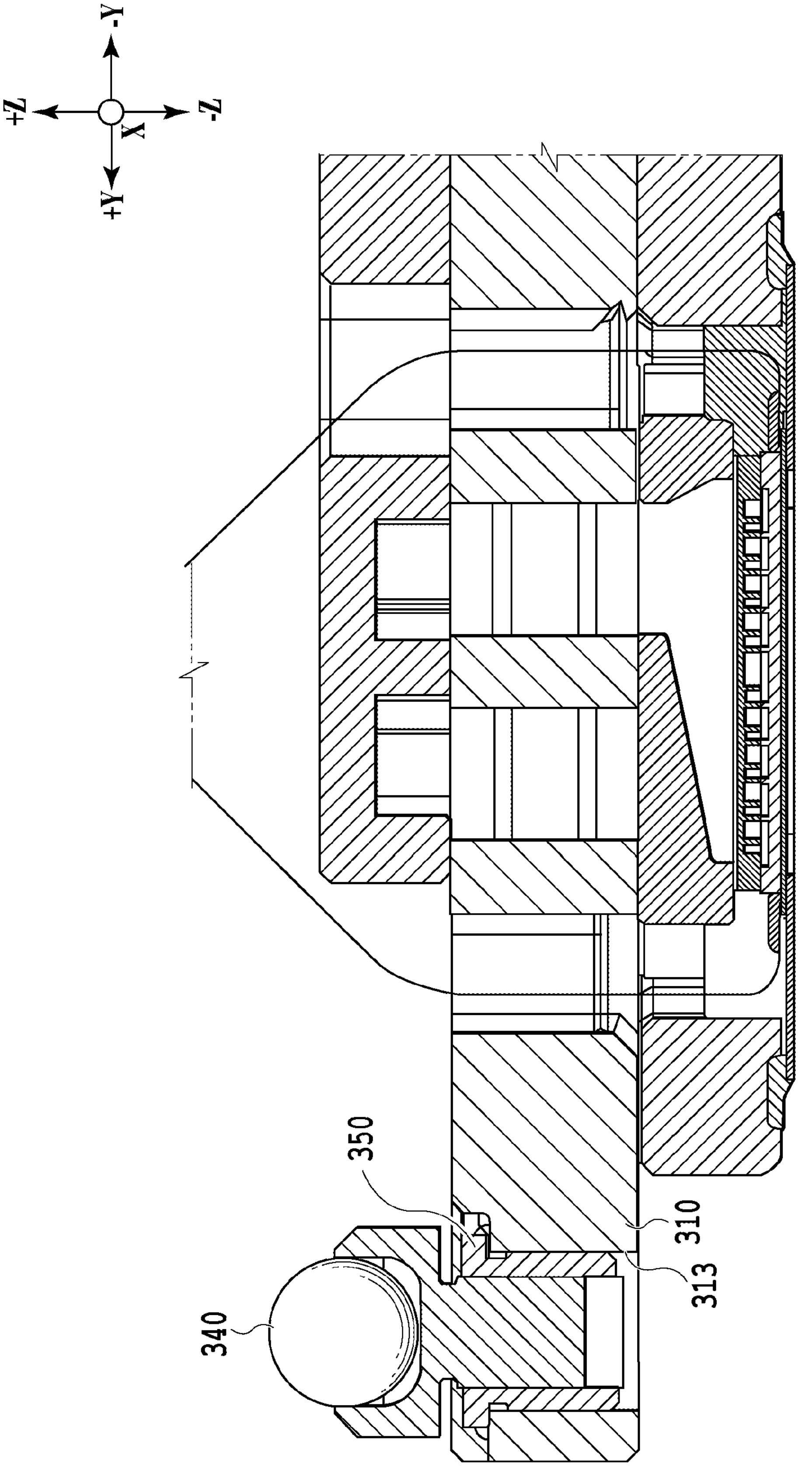
FIG. 14 is a XIV-XIV cross-sectional view of the liquid ejection head shown in FIG. 11 according to the first embodiment.

FIG. 11 is a plan view of a head in which the liquid ejection unit 200 is assembled on the support unit 300 that is viewed from an ejection surface side, and FIG. 12 is a cross-sectional view taken along a cross-section line XII-XII illustrated in FIG. 11. FIG. 13 is a cross-sectional view taken along a cross-section line XIII-XIII illustrated in FIG. 11, and FIG. 14 is a cross-sectional view taken along a cross-section line XIV-XIV illustrated in FIG. 11. As illustrated in FIGS. 12 and 13, the supply system side channel member 240 and the liquid supply member 330 are joined to the main support member 310, and liquid channels included in those three members are in fluid connection with each other. With reference to FIG. 12, the region between a peripheral portion of the substrate support member 230 and the frame body member 320 is sealed by a periphery sealing member 360 to prevent the liquid penetration. A back surface of the substrate support member 230 may be sealed by a back surface sealing member 370 for reinforcement. With reference to FIGS. 10 and 14, three holes 313 to insert the reference fixation member 350 in each of them open in the main support member 310, and such a configuration is applied in which the reference fixation member 350 is fixed in each hole 313, and the reference member 340 is fixed in the reference fixation member 350. The reference fixation member 350 may be a part integral with the main support member 310.

Figure 15A:
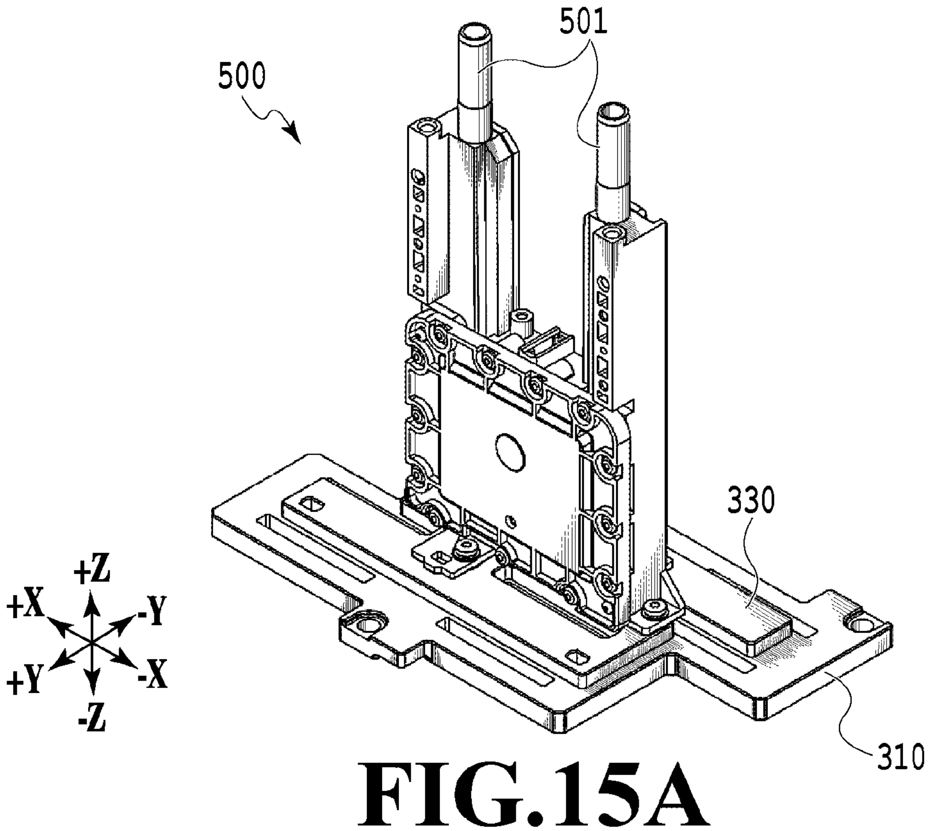
FIGS. 15A and 15B are perspective views illustrating a configuration in which members of the liquid ejection head according to the first embodiment that are related to a liquid are connected.
Figure 15B:
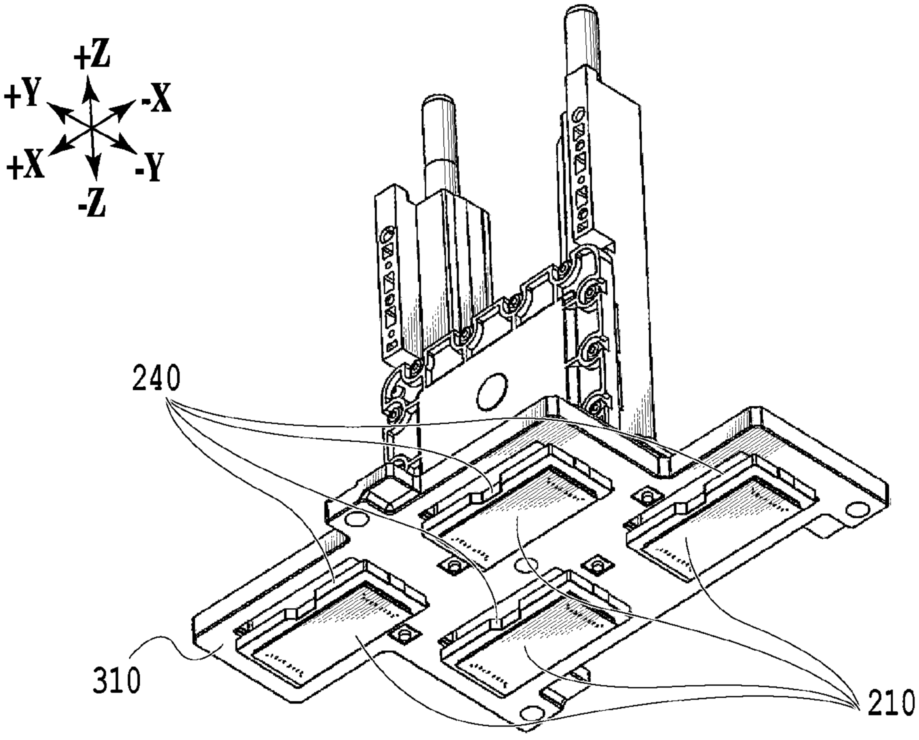

FIGS. 15A and 15B are perspective views illustrating a configuration in which members of the liquid ejection head 100 according to the present embodiment that are related to the liquid are connected. The liquid supply unit 500 includes the liquid connection unit 501 and is connected with a liquid supply system of the printing apparatus through the liquid connection unit 501. Thus, the liquid ejection head 100 is supplied with the liquid through the supply system of the printing apparatus, and additionally the liquid that passes through the inside of the liquid ejection head 100 is gathered into the supply system of the printing apparatus. In this way, the liquid can be circulated so as to pass through a route in the printing apparatus and a route in the liquid ejection head 100. A filter (not illustrated) communicating with each opening of the liquid connection unit 501 is provided inside the liquid supply unit 500 to remove a foreign substance in the supplied ink.

Figure 16:
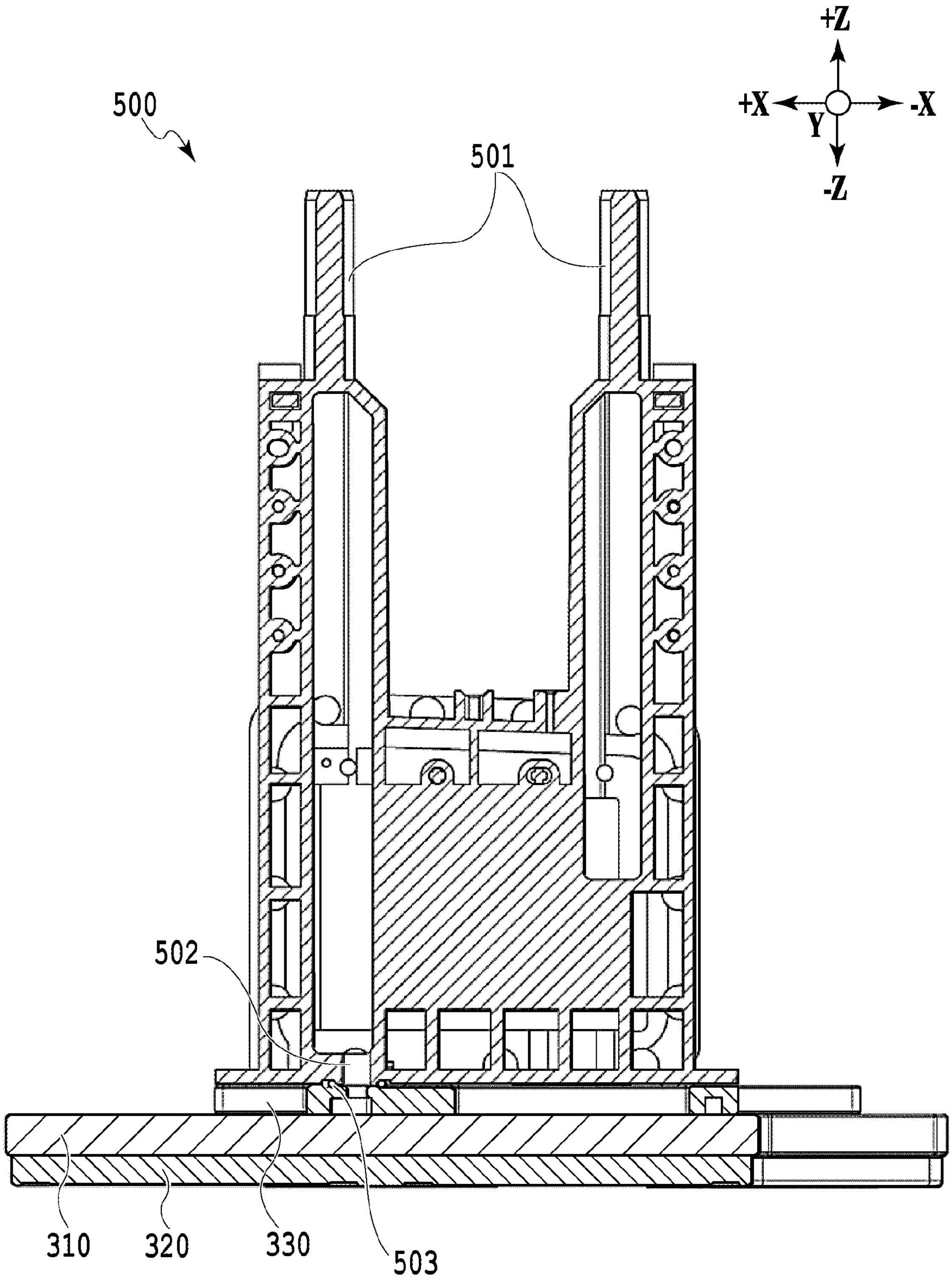
FIG. 16 is a cross-sectional view of a liquid connection configuration of the liquid ejection head according to the first embodiment.

FIG. 16 is a cross-sectional view illustrating a cross-section of the liquid supply unit 500, a cross-section of the liquid supply member 330 (including the fluid connection unit 501), and a cross-section of another member. The liquid that flows from the printing apparatus side from the liquid connection unit 501 passes through a communication port 502 and is supplied to the liquid supply member 330. A boundary between the liquid supply unit 500 and the liquid supply member 330 is sealed by an elastic member 503.

Figure 17:
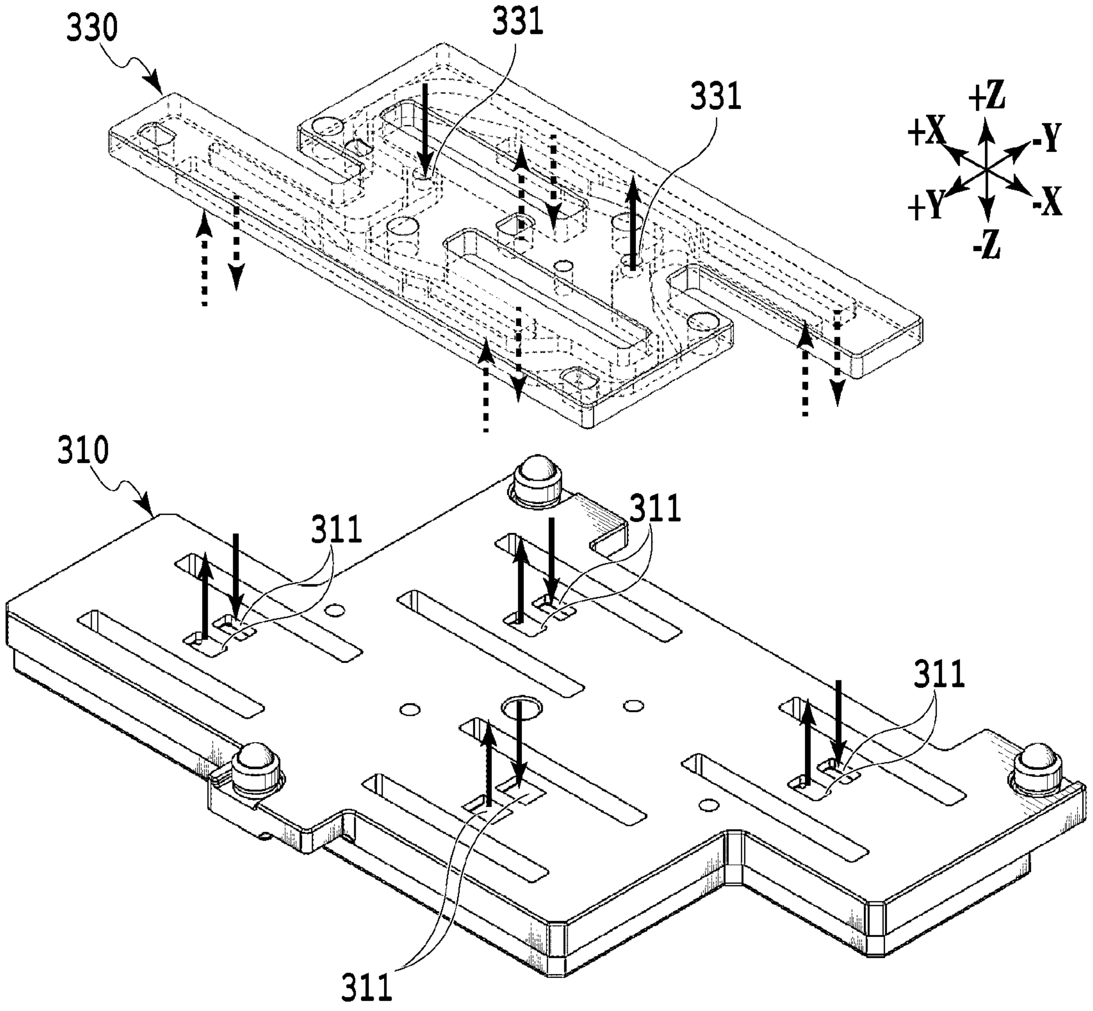
FIG. 17 is a perspective view illustrating a liquid connection configuration of the support unit according to the first embodiment.
Figure 18:
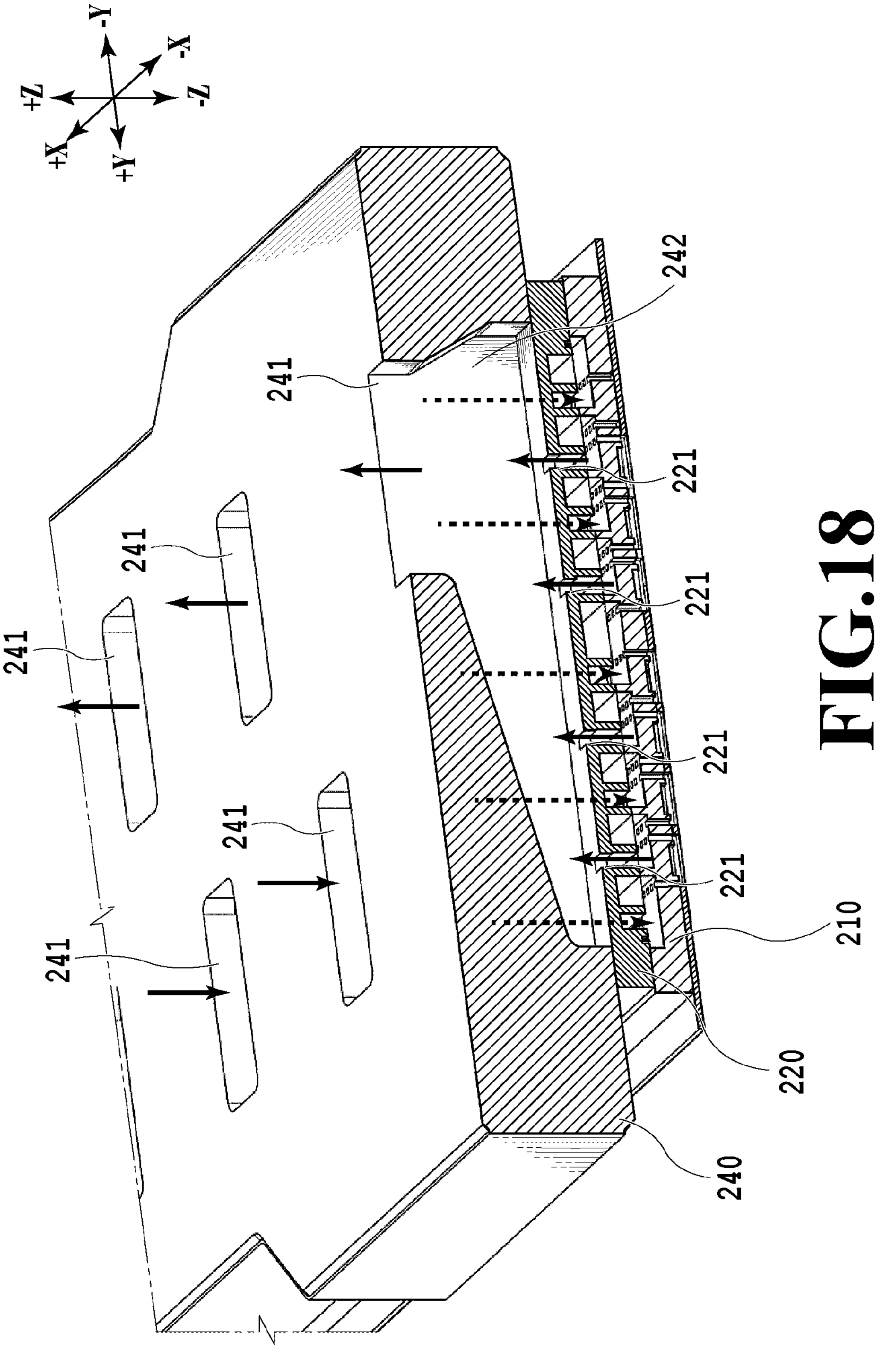
FIG. 18 is a cross-sectional view of a channel in the liquid ejection unit according to the first embodiment.

FIG. 17 is a perspective view illustrating a configuration in which members of the support unit that are related to the liquid are connected, and FIG. 18 is a perspective view illustrating a configuration in which members of the liquid ejection unit that are related to the liquid are connected. With reference to FIGS. 15 and 17, the liquid supply unit 500 and the liquid supply member 330 are in fluid connection with each other through a communication port 331. A channel that distributes the liquid to each liquid ejection unit 200 (see FIG. 6) is formed in the liquid supply member 330. With reference to FIGS. 12 and 17, the liquid supply member 330 and the main support member 310 are in fluid connection with each other through a communication port 311. With reference to FIG. 18, a liquid channel 242 is formed in the supply system side channel member 240. In FIG. 18, a downward arrow of a broken line indicates the liquid flowing through a supply channel, and an upward arrow of a solid line indicates the liquid flowing through a gathering channel. With reference to FIGS. 12 and 18, a liquid channel 312 in the main support member 310 and the liquid channel 242 in the supply system side channel member 240 of each liquid ejection unit 200 are in fluid connection with each other through a communication path 241 of the supply system side channel member 240. That is, the channel in the main support member 310 and the channel in the supply system side channel member 240 are in fluid connection with each other through the communication path 241. With reference to FIG. 18, the liquid channel 242 in the supply system side channel member 240 is in fluid connection with the substrate side channel member 220 through a communication port 221. That is, the channel in the supply system side channel member 240 and the channel in the substrate side channel member 220 are in fluid connection with each other through the communication port 221.

Figure 19:
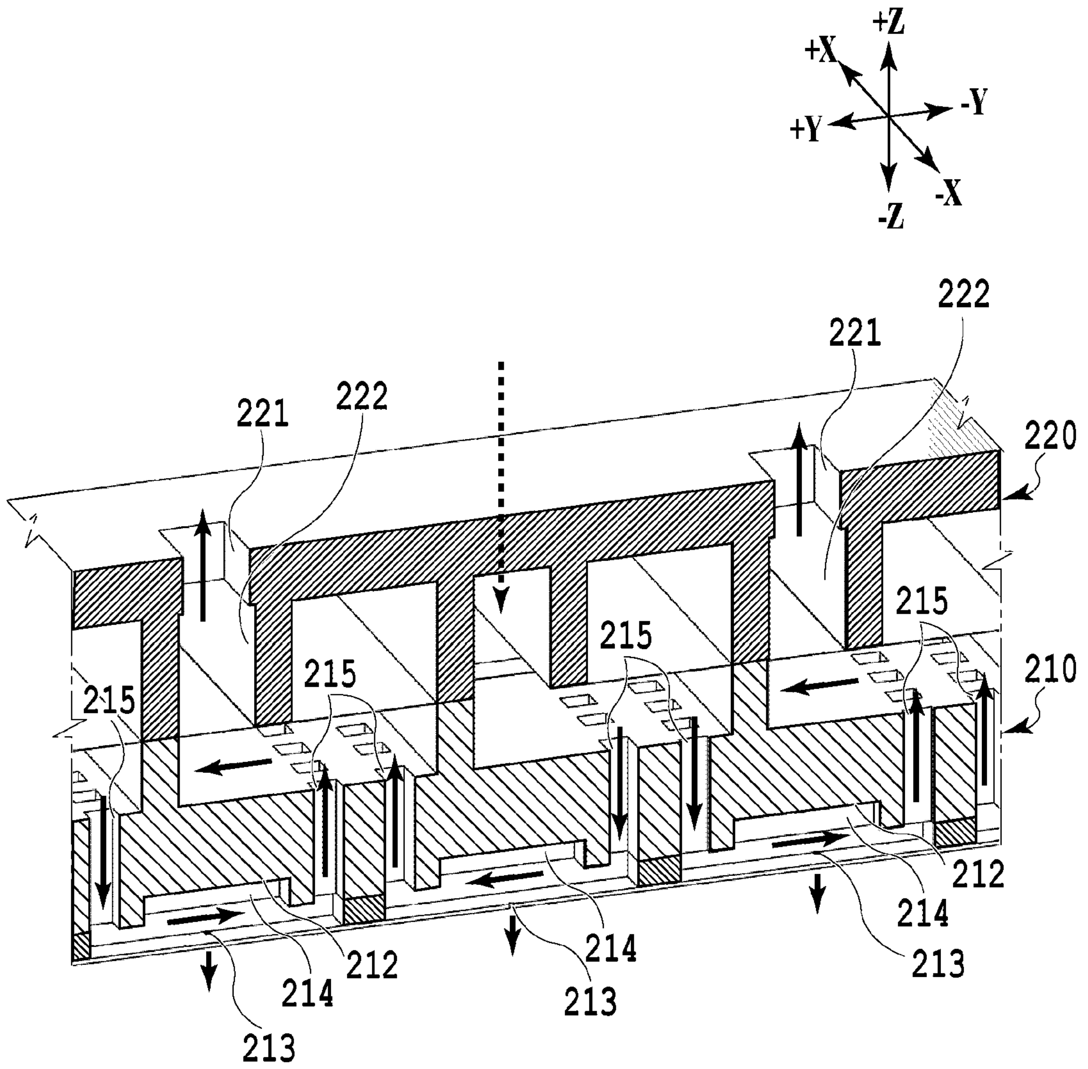
FIG. 19 is a cross-sectional view of a channel in a printing element substrate according to the first embodiment.

FIG. 19 illustrates a configuration of the fluid connection in the printing element substrate 210. The liquid flowing from each communication port 221 passes through a common channel 222 to be supplied to the printing element substrate 210 and is ejected from an ejection port 213 by a piezoelectric element 214. Note that, in FIG. 19, a downward arrow of a broken line indicates the liquid flowing through the supply channel, and an upward arrow of a solid line indicates the liquid flowing through the gathering channel. Additionally, a downward arrow of a solid line illustrated in an individual channel 215 indicates the liquid flowing through the supply channel, and an upward arrow of a solid line illustrated in the individual channel 215 indicates the liquid flowing through the gathering channel.

Figure 20:
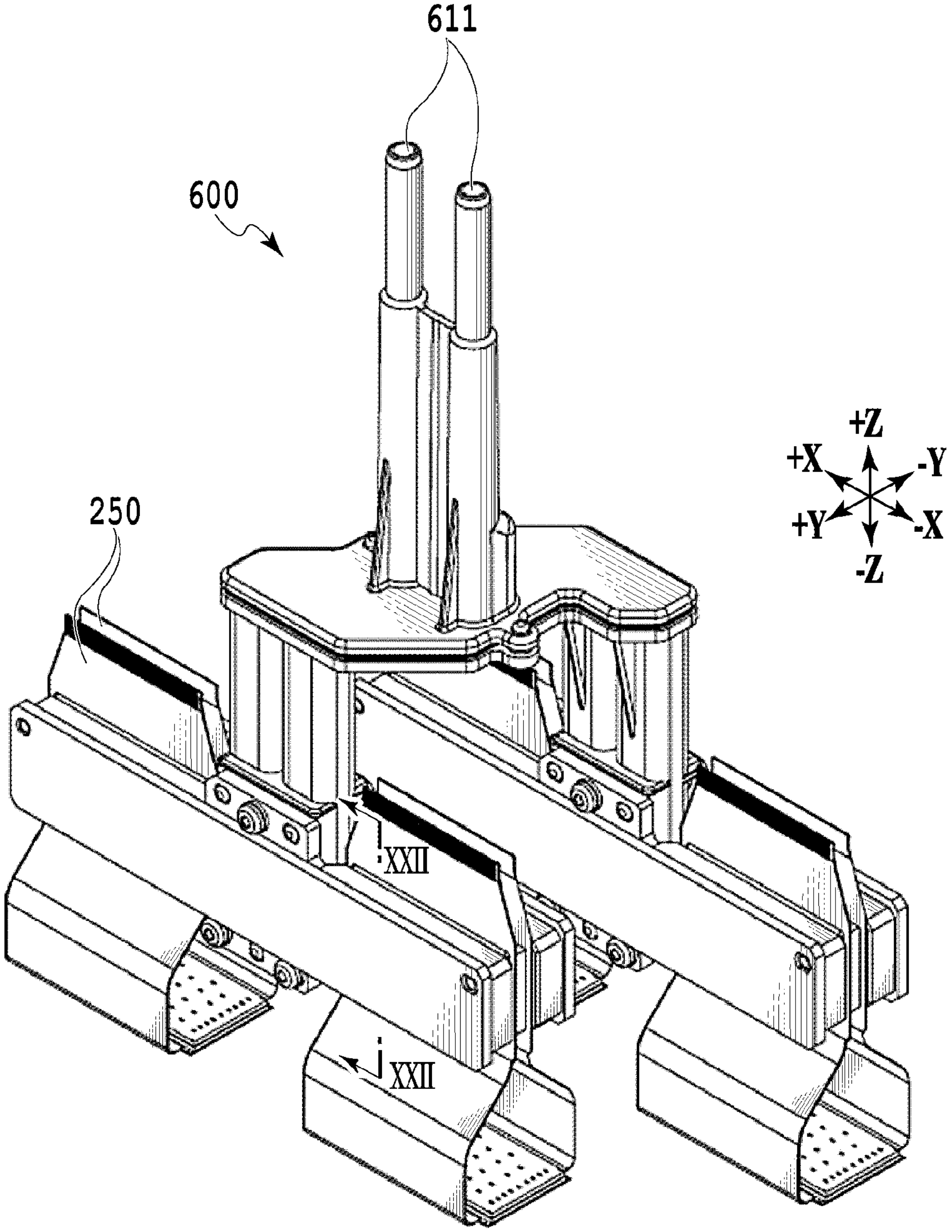
FIG. 20 is a perspective view of a cooling unit according to a first embodiment.
Figure 21:
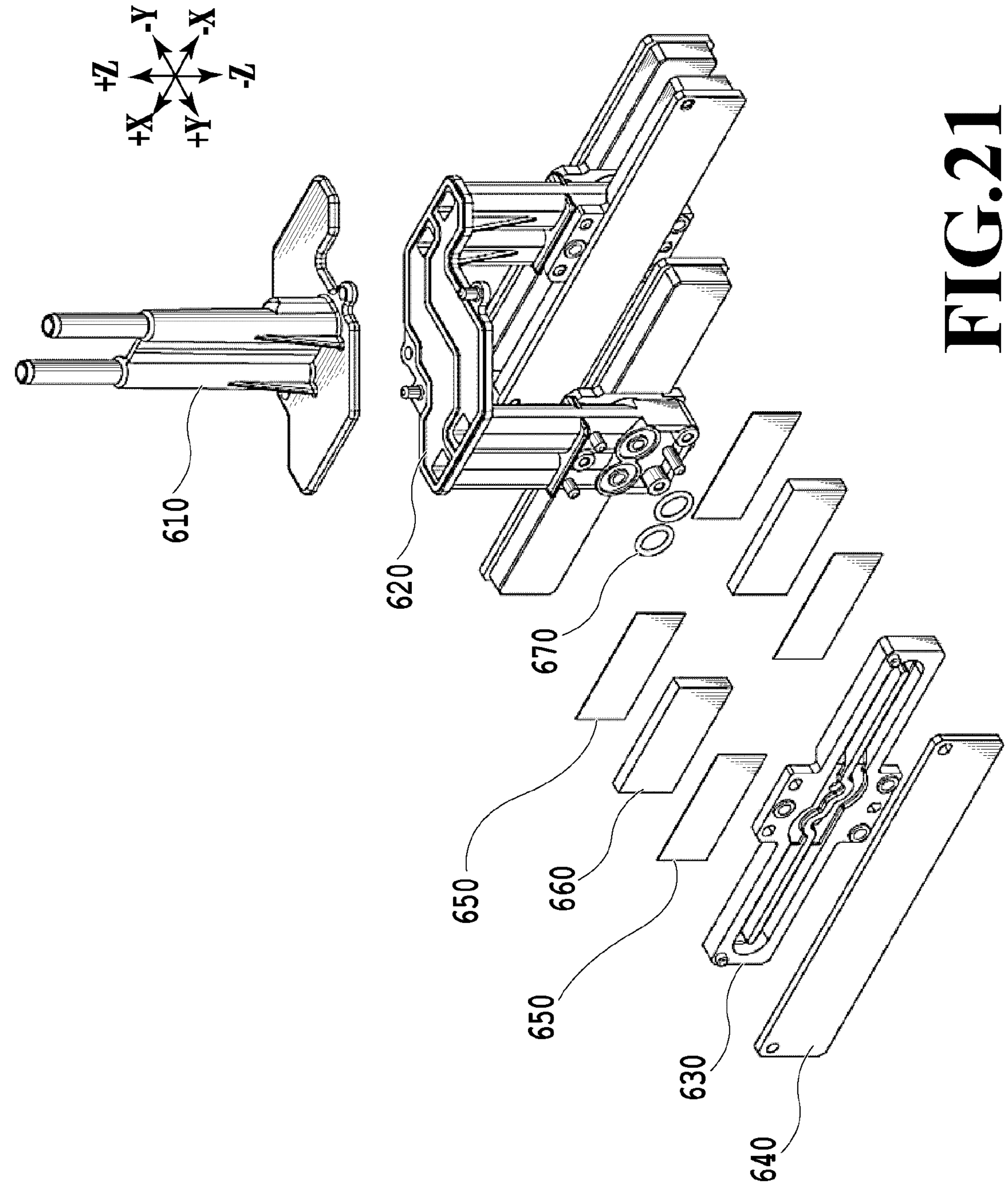
FIG. 21 is an exploded perspective view of the cooling unit according to the first embodiment.
Figure 22:
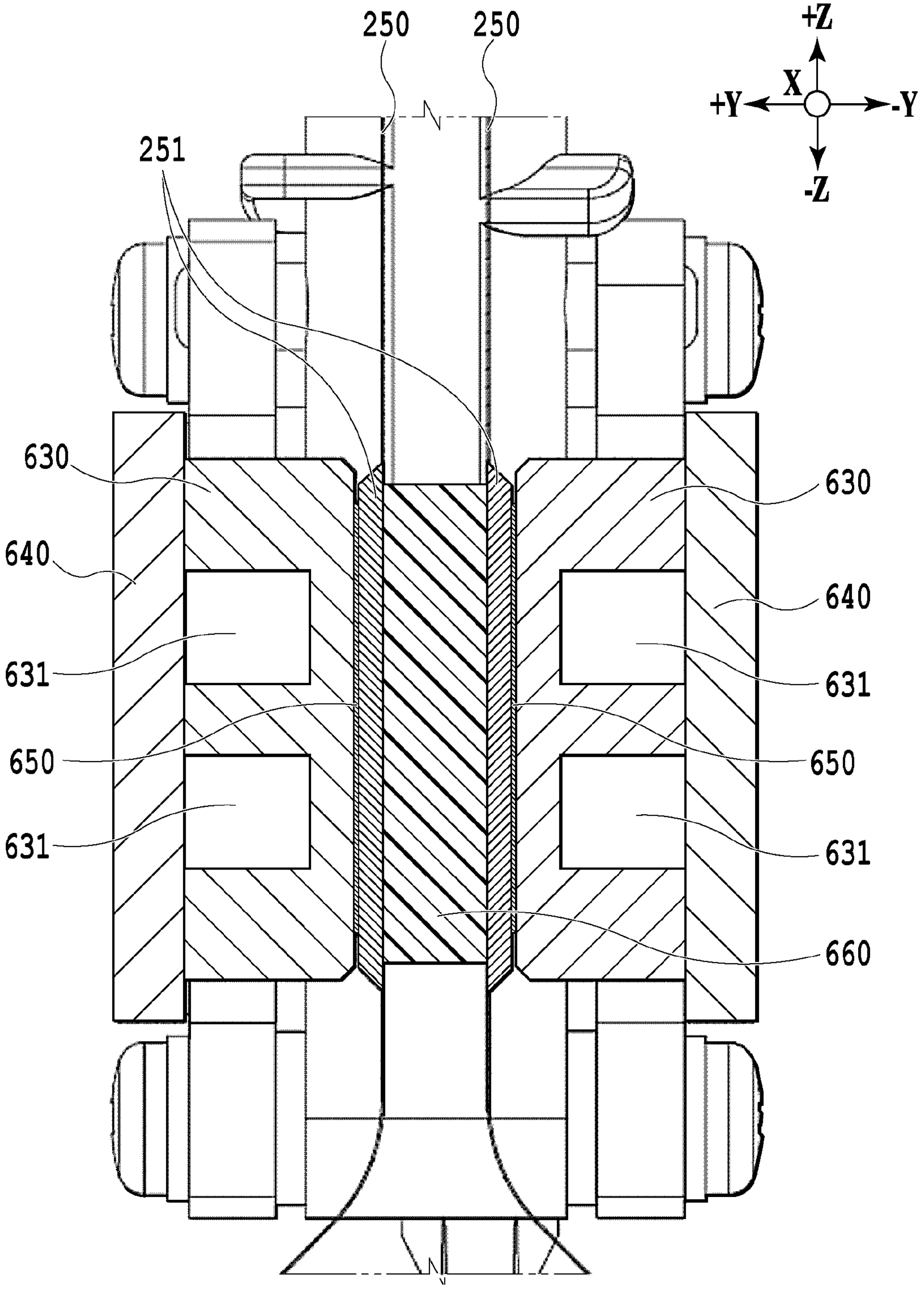
FIG. 22 is a XXII-XXII cross-sectional view of the cooling unit shown in FIG. 20 according to the first embodiment.

FIG. 20 is a perspective view of the cooling unit 600 that cools down the driving circuit substrate 251, FIG. 21 is an exploded view of the cooling unit 600, and FIG. 22 is a cross-sectional view taken along a cross-section line XXII-XXII illustrated in FIG. 20. The cooling unit 600 includes the refrigerant connection unit 611, and the refrigerant connection unit 611 connects the cooling unit 600 with a refrigerant supply system of the printing apparatus. A refrigerant is supplied to the cooling unit 600 from the refrigerant supply system of the printing apparatus through the refrigerant connection unit 611, and additionally the refrigerant that passes through the inside of the cooling unit 600 is gathered into the refrigerant supply system of the printing apparatus through the refrigerant connection unit 611. In this way, the refrigerant can be circulated so as to pass through a route in the printing apparatus and a route in the cooling unit 600. With reference to FIG. 21, the refrigerant that flows from the refrigerant connection unit 611 branches at a refrigerant channel formed in a boundary portion between a first refrigerant supply member 610 and a second refrigerant supply member 620. With reference to FIG. 21 again, the second refrigerant supply member 620 and a first cooling member 630 are in fluid connection with each other through a sealing member 670. Additionally, with reference to FIGS. 21 and 22, the refrigerant that branches in the second refrigerant supply member 620 passes by two thermal conductive members 650 adjacent to a wall of a lower end portion of the second refrigerant supply member 620 and an elastic member 660 arranged between the thermal conductive members 650 and reaches a refrigerant channel 631. In this case, the refrigerant channel 631 is formed of the first cooling member 630 and a second cooling member 640. The refrigerant is circulated through the refrigerant channel 631 and then flows into the second refrigerant supply member 620 again by way of the thermal conductive members 650 and the elastic member 660. With reference to FIG. 22, there is applied a configuration in which the first cooling member 630 is put in contact with the driving circuit substrate 251 with the thermal conductive member 650 being arranged in between, and the heat generated in an operation of the driving circuit substrate 251 is transferred to the refrigerant flowing through the refrigerant channel 631 in the first cooling member 630. The elastic member 660 is provided between the two flexible wiring substrates 250, and thus the thermal conductive member 650 can be closely adhered to the driving circuit substrate 251 reliably. As a material of the first cooling member 630, it is preferable to select a material with a thermal conductive rate as high as possible such as aluminum, for example, to facilitate the transfer of the heat generated in the driving circuit substrate 251.

Figure 23A:
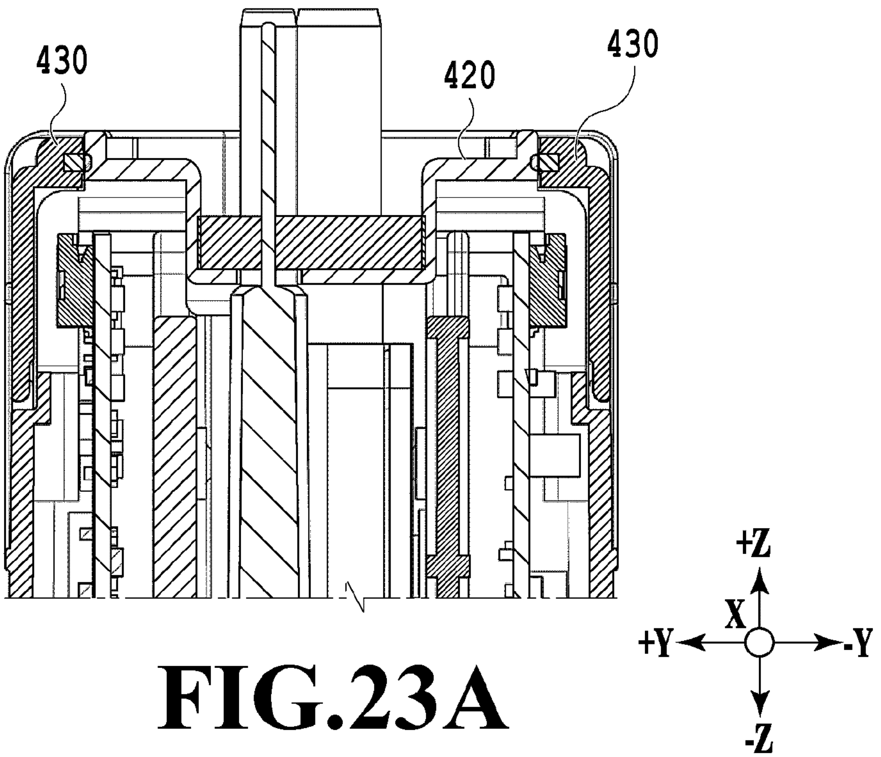
FIGS. 23A and 23B are cross-sectional views of an electric connection unit according to the first embodiment.
Figure 23B:
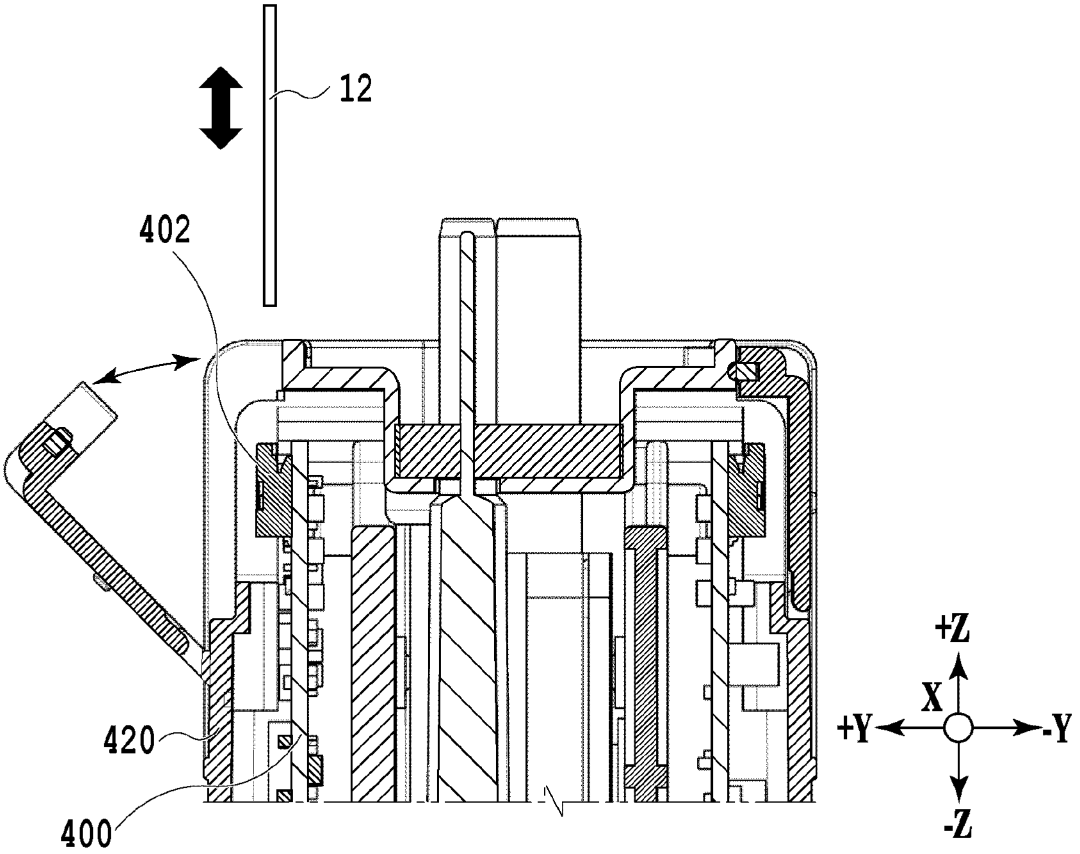

FIGS. 23A and 23B illustrate cross-sectional views of an electric connection unit between the printing apparatus and the liquid ejection head 100. The electric connection terminal 402 is formed in the electric wiring substrate 400 in the liquid ejection head 100. With the connection of the electric connection terminal 402 with a printing apparatus electric wiring unit 12, the liquid ejection head 100 is electrically connected to the printing apparatus. A periphery of the electric connection terminal 402 is covered with the openable electric connection unit cover member 430.

Figure 24:
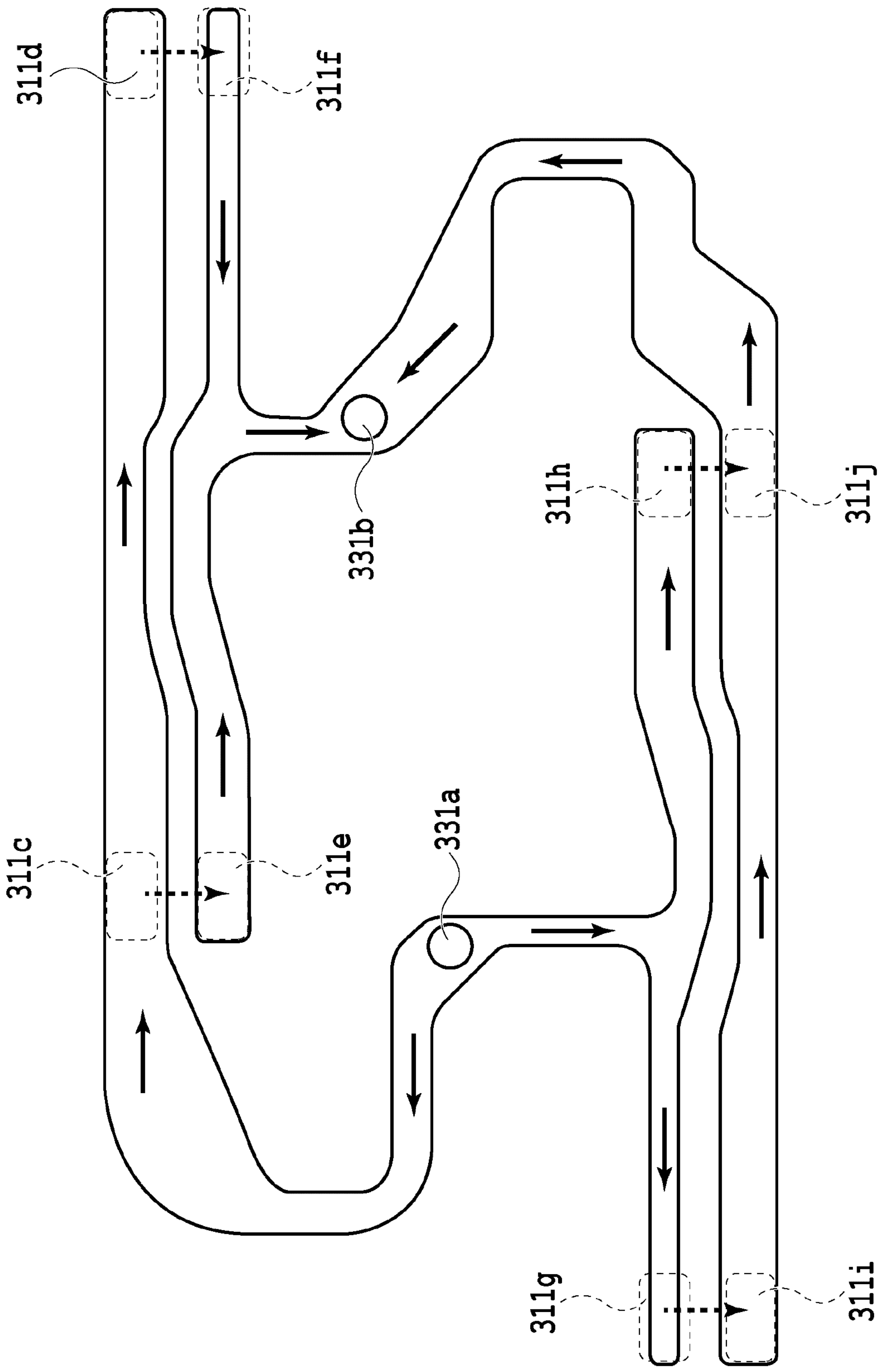
FIG. 24 is a plan view of a channel in a liquid supply member according to the first embodiment.

FIG. 24 illustrates a plan view of a channel provided inside the liquid supply member 330 illustrated in FIG. 17 that is viewed from above. A flow in the channel is described below. Note that, in the description below, 331*x* (x=a, b) indicates a communication port formed in the liquid supply member 330, and 311*y* (y=c, d, e, . . . , j) indicates a communication port formed in the main support member 310. Note that, in FIG. 17, a downward arrow of a solid line illustrated near the communication port 311 indicates the liquid flowing through the supply channel, and an upward arrow of a solid line indicates the liquid flowing through the gathering channel. Additionally, a downward arrow of a broken line and an upward arrow of a broken line near the liquid supply member 330 indicate the liquid flowing through the supply channel and the gathering channel in a case where the position of the liquid supply member 330 is a reference position. Moreover, a downward arrow of a solid line illustrated near the communication port 331 of the liquid supply member 330 indicates the liquid supplied from the one liquid connection unit 501 to the liquid supply member 330. An upward arrow of a solid line illustrated near the communication port 331 indicates the liquid flowing from the liquid supply member 330 to the other liquid connection unit 501.

With reference to FIG. 24, the liquid that flows first from the liquid supply unit 500 through the communication port 502 and a communication port a (331*a*) branches into two lines, which are a series configuration distribution channel and a parallel configuration distribution channel provided in the liquid supply member 330. The series configuration distribution channel herein indicates a channel having a positional relationship like that of the communication port a (331*a*), a communication port c (311*c*), and a communication port d (311*d*). A fluid flowing from the communication port a (331*a*) passes through the channel provided in the liquid supply member 330 and flows into the liquid channel 242 from the two ports connected to the communication port a (331*a*), which are the communication port c (311*c*) and the communication port d (311*d*). In this case, a channel coupling the communication port a (331*a*) as an inlet with the communication port d (311*d*) as the most downstream communication port completely includes a channel coupling the communication port a (331*a*) as the inlet with the communication port c (311*c*) as the rest of the communication ports. That is, the communication port c (311*c*) exists in the channel coupling the communication port a (331*a*) with the communication port d (311*d*). In this case, the I-shaped channel coupling the communication port a (331*a*), the communication port c (311*c*), and the communication port d (311*d*) with each other is called the series configuration distribution channel. In the I-shaped series configuration distribution channel, the communication port a (331*a*) as the inlet and the communication port d (311*d*) as an outlet are arranged at two ends, and the communication port c (311*c*) as an outlet is arranged in a middle position. Note that, in a case where the inlet and the outlet are switched, a series configuration collection channel is formed. In the example in FIG. 24, an I-shaped channel coupling a communication port i (311*i*) as the most upstream communication port, a communication port j (311*j*) as another communication port, and the communication port b (331*b*) as an outlet with each other is the series configuration collection channel.

On the other hand, the parallel configuration distribution channel indicates a channel that couples the communication port a (331*a*), a communication port g (311*g*), and a communication port h (311*h*) with each other. A channel coupling the communication port a (331*a*) with the communication port g (311*g*) does not completely include a channel coupling the communication port a (331*a*) with the communication port h (311*h*) but includes a part of the channel coupling the communication port a (331*a*) with the communication port h (311*h*). That is, the communication port h (311*h*) does not exist in the channel coupling the communication port a (331*a*) with the communication port g (311*g*). The channel connecting the communication port a (331*a*) with the communication port g (311*g*) and the channel connecting the communication port a (331*a*) with the communication port h (311*h*) coincide with each other from the communication port a (331*a*) to a branch point. However, a channel from the branch point to the communication port g (311*g*) and a channel from the branch point to the communication port h (311*h*) exist separately. In this case, the Y-shaped channel coupling the communication port a (331*a*), the communication port g (311*g*), and the communication port h (311*h*) with each other is called the parallel configuration distribution channel. In the Y-shaped parallel configuration distribution channel, the communication port a (331*a*) as the inlet, the communication port g (311*g*) as an outlet, and the communication port h (311*h*) as an outlet are arranged at three ends. Note that, in a case where the inlet and the outlet are switched, a parallel configuration collection channel is formed. In the example in FIG. 24, a channel coupling a communication port e (311*e*) as an inlet, a communication port f (311*f*) as an inlet, and a communication port b (331*b*) as the outlet with each other is the parallel configuration collection channel.

A part of the liquid flowing in from the communication port a (331*a*) passes through the series channel and the communication port c (311*c*) and the communication port d (311*d*) and is supplied to the channel in the printing element substrate 210. Additionally, the rest of the liquid flowing in from the communication port a (331*a*) passes through the parallel channel and the communication port g (311*g*) and the communication port h (311*h*) and is supplied to the channel in the printing element substrate 210. With reference to FIG. 19, the fluid supplied to the channel in the printing element substrate 210 passes through the common channel 222 and the individual channel 215 and is supplied to the pressure chamber. A part of the liquid supplied to the pressure chamber is ejected from the ejection port 213 by the piezoelectric element 214 for the image printing, and the rest of the liquid is not ejected and is returned to the liquid supply unit 500 as described later. That is, the liquid that is not ejected from the ejection port 213 passes through the individual channel 215 and the common channel 222 and flows into the communication port e (311*e*), the communication port f (311*f*), the communication port i (311*i*), and the communication port j (311*j*). The liquid that flows into the communication port e (311*e*) and the communication port f (311*f*) passes through the parallel channel and reaches the communication port b (331*b*). The liquid that flows into the communication port i (311*i*) and the communication port j (311*j*) passes through the series channel and reaches the communication port b (331*b*). As described above, the liquid that reaches the communication port b (331*b*) is returned to the liquid supply unit 500.

In this case, both the series channel coupling the communication port a (331*a*), the communication port c (311*c*), and the communication port d (311*d*) with each other and parallel channel coupling the communication port a (331*a*), the communication port g (311*g*), and the communication port h (311*h*) with each other belong to a forward path. On the other hand, both the parallel channel coupling the communication port e (311*e*), the communication port f (311*f*), and the communication port b (331*b*) with each other and series channel coupling the communication port i (311*i*), the communication port j (311*j*), and the communication port b (331*b*) with each other belong to a return path. With reference to FIG. 24, as illustrated by the coupling using four arrows of a broken line, the liquid that flows through the series channel in the forward path flows through the parallel channel in the return path. Additionally, the liquid that flows through the parallel channel in the forward path flows through the series channel in the return path.

In the present embodiment, the four printing element substrates 210 arranged in a staggered manner in FIGS. 3 and 11 are arranged in positions corresponding to the positions of the arrangement of the communication ports 331*x* and 311*y*, corresponding to the respective printing element substrates 210, in the array illustrated in FIG. 24. However, the present disclosure is not limited thereto, and the four printing element substrates 210 may be arranged in positions other than the positions corresponding to the positions of the arrangement in the array illustrated in FIG. 24. Additionally, the communication ports 331*x* and 311*y* may be arranged in positions other than the positions illustrated in FIG. 24.

Figure 25:
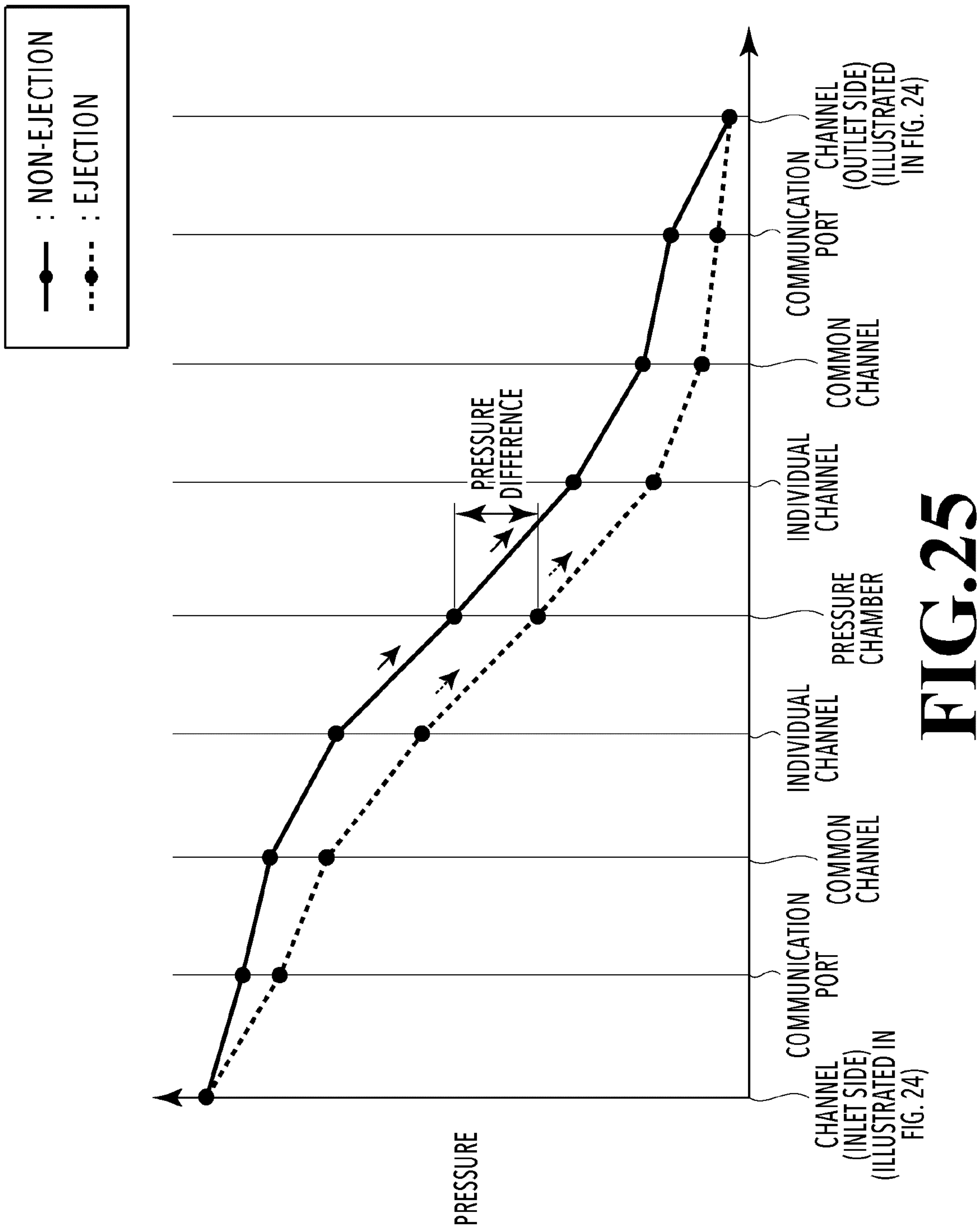
FIG. 25 is a schematic view of a pressure difference between pressure chambers according to the first embodiment.

A flow resistance in the channel in the liquid supply member 330 is described below with reference to FIG. 25. As an example, an allowable negative pressure range in the pressure chamber illustrated in FIG. 19 needs to be −220 to −350 mmAq or desirably needs to be −220 to −300 mmAq. This is necessary for a meniscus surface in the ejection port to be in an appropriate state for the ejection. Therefore, it is necessary to keep the above-described allowable negative pressure limit also in a case where a flow rate is increased because the state transitions from non-ejection to ejection. In the ejection, the individual channel 215 illustrated in FIG. 19 is immediately filled again with the fluid after the fluid ejection due to capillary phenomenon; therefore, the flow increased by the ejection almost stops in the next ejection, and there is a flow of only the circulation similar to that in the non-ejection. In other words, it is unnecessary to take account of a pressure loss caused by the increased flow rate in the ejection in the individual channel 215. On the other hand, in the common channel 222, in a case where the fluid is sequentially ejected from the multiple pressure chambers to communicate with the multiple individual channels 215, a constant flow rate increase occurs constantly, and the pressure loss increases. Accordingly, the pressure loss in the common channel 222 communicating with both the channel illustrated in FIG. 24 and the individual channel 215 illustrated in FIG. 19 needs to be at least within a range of the allowable negative pressure range at a flow rate comparable to a fluid ejection amount. That is, as described above, in a case where the allowable negative pressure range is −220 to −350 mmAq, the pressure loss at the ejection flow rate needs to be equal to or smaller than 130 mmAq. Additionally, taking account of a pressure loss in a channel other than the channel illustrated in FIG. 24, the pressure loss at the flow rate comparable to the fluid ejection amount in the channel illustrated in FIG. 24 is desirably substantially a half or smaller than, or is more desirably a quarter or smaller than, the above-described range of the allowable negative pressure range. That is, although the channel illustrated in FIG. 24 includes the distribution channel and the collection channel, in both the channels, the pressure loss at the flow rate of the ejection from the pressure chamber is preferably equal to or smaller than the range of the allowable negative pressure range that allows for the normal ejection. Moreover, taking account of the pressure loss in the channel other than the channel illustrated in FIG. 24, the pressure loss is desirably a half or smaller than, or is more desirably a quarter or smaller than, the range. In other words, in a case where the above-described allowable negative pressure range is −220 to −350 mmAq, the pressure loss is desirably equal to or smaller than 65 mmAq or is more desirably equal to or smaller than 32.5 mmAq. Furthermore, as an example, since an ejection amount in the present example is 90 ml/min, and a fluid viscosity is 4 cP, the flow resistance in the channel illustrated in FIG. 24 (that is, the sum of flow resistances in the above-described distribution channel and the above-described collection channel) is desirably equal to or smaller than 0.36 mmAg/(ml/min)/cP. Additionally, it is more desirably equal to or smaller than 0.18 mmAq/(ml/min)/cP. In this case, 0.36 mmAq/(ml/min)/cP is obtained from 65 mmAq/(90/2 (ml/min))/4 cP taking account of a change in the ejection amount into half upstream and downstream of the printing element substrate in a case where the liquid is fully ejected. Likewise, 0.18 mmAq/(ml/min)/cP is obtained from 32.5 mmAq/(90/2 (ml/min))/4 cP.

It is ideal that the channel illustrated in FIG. 24 is designed to have a small flow resistance as described above; however, on the other hand, it is also necessary to reduce the size and the cost of the liquid ejection head, and thus there is a limitation to widen the channel by increasing the liquid supply member 330. In this case, in the series channel illustrated in FIG. 24, a pressure difference occurs between the communication port a (331*a*) on the upstream side and the four communication ports on the downstream side, which are the communication port c (311*c*), the communication port d (311*d*), the communication port g (311*g*), and the communication port h (311*h*).

A channel that passes through the communication port a (331*a*), the communication port c (311*c*), the communication port e (311*e*), and the communication port b (331*b*) is a channel A. A channel that passes through the communication port a (331*a*), the communication port d (311*d*), the communication port f (311*f*), and the communication port b (331*b*) is a channel B. A relationship between the pressure in a pressure chamber A between the communication port c (311*c*) and the communication port e (311*e*) in the channel A and the pressure in the pressure chamber B between the communication port d (311*d*) and the communication port f (311*f*) in the channel B is as follows. That is, the pressure of the liquid flowing into the pressure chamber B is lower than the pressure of the liquid flowing into the pressure chamber A by a pressure difference due to a pressure loss that occurs in the channel from the communication port c (311*c*) to the communication port d (311*d*). That is, the pressure difference occurs between the pressure chambers, and the ejected liquid droplet is uneven between the pressure chambers.

Therefore, the above-described problem of the pressure difference is solved as follows. A position at which the channel from the communication port e and the channel from the communication port f join together in the return path is a join position ef. The shape of a channel Ap from the communication port e (311*e*) to the join position ef is made different from the shape of a channel Bp from the communication port f (311*f*) to the join position ef to solve the above-described problem of the pressure difference.

Specifically, in the return path on the side of the communication port e (311*e*) corresponding to the communication port c (311*c*) with a higher pressure, the cross-section area is increased, and the pressure loss is reduced. On the other hand, in the return path on the side of the communication port f (311*f*) corresponding to the communication port d (331*d*) with a lower pressure, the cross-section area is reduced, and the pressure loss is increased. Alternatively, the pressure loss is adjusted by adjusting the length of the above-described channel. With this, an effect that an average pressure of the communication port c (311*c*) and the communication port e (311*e*) and an average pressure of the communication port d (311*d*) and the communication port f (311*f*) have substantially the same value to each other is obtained. In this case, the average pressure of the communication port c (311*c*) and the communication port e (311*e*) is the internal pressure in the pressure chamber A. Additionally, the average pressure of the communication port d (311*d*) and the communication port f (311*f*) is the pressure in the pressure chamber B. Accordingly, the pressure in the pressure chamber A and the pressure in the pressure chamber B have substantially the same value to each other.

Additionally, a similar problem occurs between a pressure chamber C between the communication port g (311*g*) and the communication port i (311*i*) and a pressure chamber D between the communication port h (311*h*) and the communication port j (311*j*). However, this problem is solved in a similar way to the above description as follows. That is, a position in which a channel C from the communication port a (331*a*) to the communication port g (311*g*) and a channel D from the communication port a (331*a*) to the communication port h (311*h*) branch from each other is a branch position gh. The shape of a channel from the branch position gh to the communication port g (311*g*) is made different from the shape of a channel from the branch position gh to the communication port h (311*h*) to solve the problem.

Specifically, in the forward path from the branch position gh to the communication port g (311*g*) with a higher pressure, the cross-section area is reduced, and the pressure loss is increased. In the forward path from the branch position gh to the communication port h (331*h*) with a lower pressure, the cross-section area is increased, and the pressure loss is reduced. Alternatively, the pressure loss is adjusted by adjusting the length of the above-described channel. With this, an effect that an average pressure of the communication port g (311*g*) and the communication port i (311*i*) and an average pressure of the communication port h (311*h*) and the communication port j (311*j*) have substantially the same value to each other is obtained. In this case, the average pressure of the communication port g (311*g*) and the communication port i (311*i*) is the internal pressure in the pressure chamber C. Additionally, the average pressure of the communication port h (311*h*) and the communication port j (311*j*) is the pressure in the pressure chamber D. Accordingly, the pressure in the pressure chamber C and the pressure in the pressure chamber D have substantially the same value to each other.

Thus, the pressures in the pressure chambers illustrated in FIG. 19 are equalized, and it is possible to equalize ink droplet diameters.

Figure 26A:
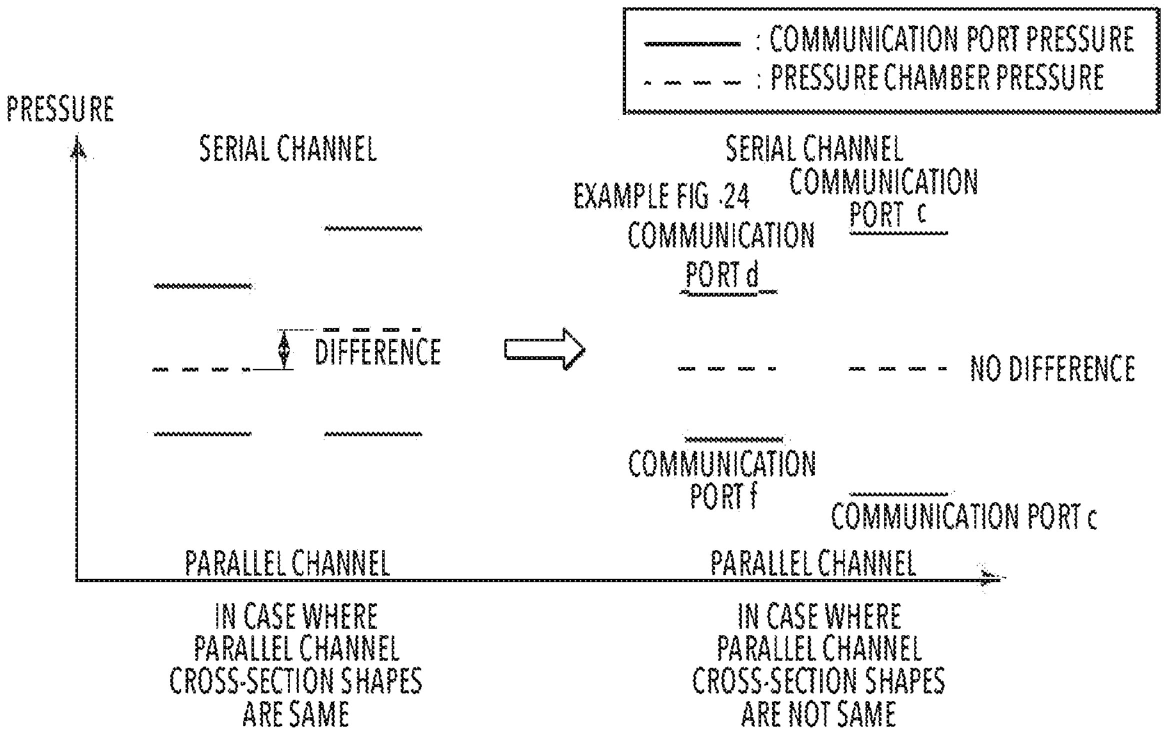
FIGS. 26A and 26B are explanatory views of a pressure in the pressure chamber generated by the shape of the channel in the liquid supply member according to the first embodiment.
Figure 26B:
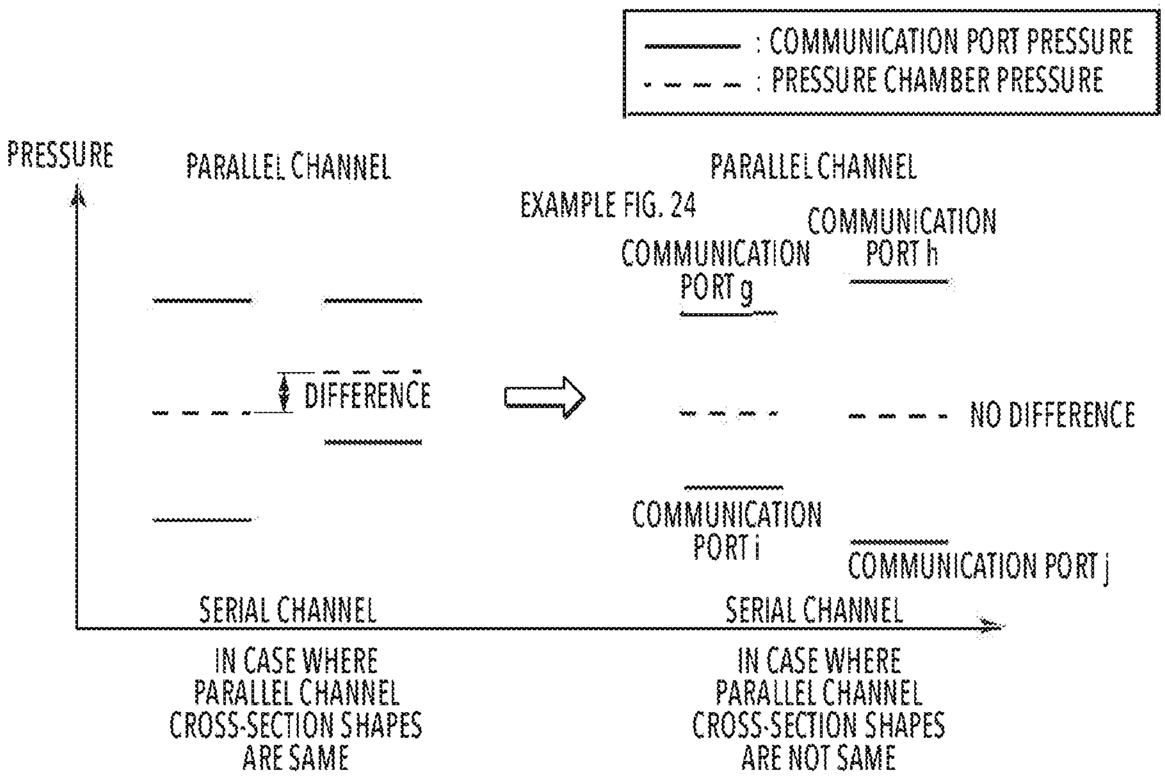

That is, in a case where the cross-section shapes of the parallel channel are the same, the pressure in the pressure chamber differs between the printing element substrates as illustrated in FIG. 26A. On the other hand, in a case where the cross-section shapes of the parallel channels are not the same as described above, no difference of the pressure in the pressure chamber occurs between the printing element substrates as illustrated in FIG. 26B.

Figure 27:
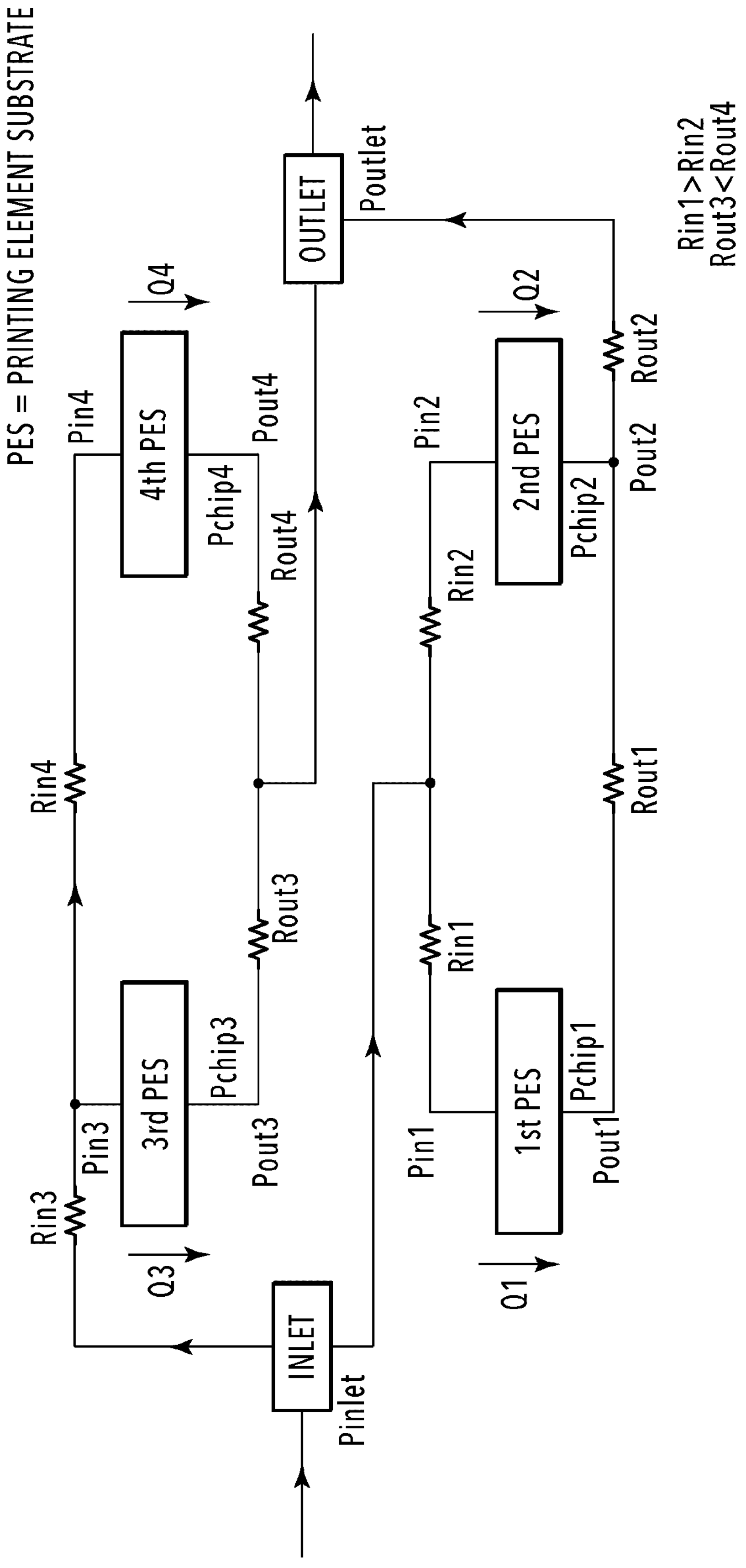
FIG. 27 is an explanatory view of a pressure in each portion in a head including three or more printing element substrates arranged in a staggered manner according to the first embodiment.

The equalization of the pressures in the pressure chambers in the above-described configuration is described in terms of a relationship between flow resistances in the channels as follows. The pressure difference in the pressure chamber between the printing element substrates in a case where the forward path has the parallel channel configuration and the return path has the series channel configuration in FIG. 27 is described below. First, in FIG. 27, the pressures upstream and downstream the printing element substrates are expressed by the following expressions:

$$P_{in1} = P_{inlet} - Q_1 \times R_{in1} \quad (1)$$

$$P_{in2} = P_{inlet} - Q_2 \times R_{in2} \quad (2)$$

$$P_{out1} = P_{outlet} + (Q_1 + Q_2) \times R_{out2} + Q_1 \times R_{out1} \quad (3)$$

$$P_{out2} = P_{outlet} + (Q_1 + Q_2) \times R_{out2}, \quad (4)$$

where $P_{inlet}$: channel member inlet pressure $P_{outlet}$: channel member outlet pressure $P_{in1}$: upstream pressure in first printing element substrate $P_{out1}$: downstream pressure in first printing element substrate $P_{in2}$: upstream pressure in second printing element substrate $P_{out2}$: downstream pressure in second printing element substrate $Q_1$: liquid flow rate flowing in first printing element substrate $Q_2$: liquid flow rate flowing in second printing element substrate $R_{in1}$: product of flow resistance in upstream channel in first printing element substrate and liquid viscosity $R_{in2}$: product of flow resistance in upstream channel in second printing element substrate and liquid viscosity $R_{out1}$: product of flow resistance in downstream channel in first printing element substrate and liquid viscosity $R_{out2}$: product of flow resistance in downstream channel in second printing element substrate and liquid viscosity.

In this case, the pressure in the pressure chamber of each printing element substrate is expressed by the following expressions:

$$P_{chip1} = (P_{in1} + P_{out1})/2 \quad (5)$$

$$P_{chip2} = (P_{in2} + P_{out2})/2, \quad (6)$$

where $P_{chip1}$: pressure chamber pressure of first printing element substrate $P_{chip2}$: pressure chamber pressure of second printing element substrate In this case, an allowable value of the pressure fluctuation in the pressure chamber in the printing element substrates is defined by the following expression on the basis of that ejection volume fluctuation should be less than 2.5%, which is demanded in terms of prevention of image unevenness, and a pressure dependence coefficient of ejection volume 0.027%/mmAq:

$$P_{ok} = 2.5/0.027 = 93 \text{ mm Aq} \quad (7)$$

where, $P_{ok}$: allowable value of pressure fluctuation in pressure chamber between printing element substrates.

Accordingly, allowable difference of the pressure in the pressure chamber between the printing element substrates is defined by the following expression:

$$|P_{chip1} - P_{chip2}| < P_{ok} = 93 \text{ mm Aq}. \quad (8)$$

That is, the difference of the pressure in the pressure chamber between the printing element substrates should be within 93 mmAq.

Additionally, in this case, if it is assumed that the flow rates of the liquid flowing through the printing element substrates are equal to each other, i.e., $Q=Q_1=Q_2$, the allowable difference of the pressure in the pressure chamber between the printing element substrates is as follows:

$$|P_{chip1} - P_{chip2}| = Q|R_{in1} - R_{out1} - R_{in2}|/2, \quad (9)$$

where $r=R/\eta$ (10), where it is defined that r: flow resistance, and $\eta$: viscosity. Additionally, in the present embodiment, Q=25 ml, and liquid viscosity $\eta$=4 cP are assumed, and a relationship of the following expression is obtained from the expression (9) and the expression (10).

$$|(r_{in1} - r_{in2}) - r_{out1}| < (2P_{ok})/Q\eta = (2 \times 93)/(25 \times 4) = 1.86 \text{ mm Aq}/(\text{ml/min})/\text{cP}. \quad (11)$$

The pressure difference between the printing element substrates in a case where the forward path has the series channel configuration and the return path has the parallel channel configuration in FIG. 27 is described below. In FIG. 27, the pressures upstream and downstream of the printing element substrates are defined by the following expressions:

$$P_{in3} = P_{inlet} - (Q_3 + Q_4) \times Ri_{n3} \quad (12)$$

$$P_{in4} = P_{inlet} - (Q_3 + Q_4) \times Ri_{n3} - Q_4 \times R_{in4} \quad (13)$$

$$P_{out3} = P_{outlet} + Q_3 \times R_{out3} \quad (14)$$

$$P_{out4} = P_{outlet} + Q_4 \times R_{out4}, \quad (15)$$

where $P_{inlet}$: channel member inlet pressure $P_{outlet}$: channel member outlet pressure $P_{in3}$: upstream pressure in third printing element substrate $P_{out3}$: downstream pressure in third printing element substrate $P_{in4}$: upstream pressure in fourth printing element substrate $P_{out4}$: downstream pressure in fourth printing element substrate $Q_3$: liquid flow rate flowing in third printing element substrate $Q_4$: liquid flow rate flowing in fourth printing element substrate $R_{in3}$: product of flow resistance in upstream channel in third printing element substrate and liquid viscosity $R_{in4}$: product of flow resistance in upstream channel in fourth printing element substrate and liquid viscosity $R_{out3}$: product of flow resistance in downstream channel in third printing element substrate and liquid viscosity $R_{out4}$: product of flow resistance in downstream channel in fourth printing element substrate and liquid viscosity.

In this case, the pressure in the pressure chamber of each printing element substrate is defined by the following expressions:

$$P_{chip3} = (P_{in3} + P_{out3})/2 \tag{16}$$

$$P_{chip4} = (P_{in4} + P_{out4})/2, \tag{17}$$

where $P_{chip3}$: pressure chamber pressure of third printing element substrate $P_{chip4}$: pressure chamber pressure of fourth printing element substrate In this case, an allowable value of the pressure fluctuation in the pressure chamber between the printing element substrates is expressed by the expression (7).

Accordingly, the allowable difference of the pressure in the pressure chamber between the printing element substrates is defined by the following expression:

$$|P_{chip3} - P_{chip4}| < P_{ok} = 93 \text{ mm Aq.} \tag{18}$$

Additionally, in this case, if it is hypothesized that (Q=Q3=Q4) in a case where the liquid flow rates flowing through the printing element substrates are equal to each other, the allowable difference of the pressure in the pressure chamber between the printing element substrates is as follows:

$$|P_{chip3} - P_{chip4}| = Q|R_{out3} + R_{in4} - R_{out4}|/2. \tag{19}$$

In this case, in the Expression (10) and in the present embodiment, Q=25 ml and liquid viscosity η=4 cP are assumed, and a relationship of the following expression is obtained from the expression (18) and the expression (19):

$$|r_{in4} - (r_{out4} - r_{out3})| < (2P_{ok})/Q\eta = (2\times 93)/(25\times 4) = 1.86 \text{ mm Aq/(mi/min)/cP.} \tag{20}$$

As described above, in order to suppress the pressure difference between the pressure chambers, the channels in the liquid supply member 330 illustrated in FIG. 24 are provided with a difference in the flow resistances. However, due to the difference in the flow resistances, the differential pressure across the printing element substrate 210 varies among the printing element substrates 210, and the flow rate of the circulation varies among the printing element substrates 210. In order to ensure the ejection function in a case where the variation of the circulation flow rate is great, the entire flow rate needs to be increased such that even the pressure chamber of the printing element substrate with the smallest differential pressure secures the necessary circulation flow rate. As a result, the flow rate of the fluid to be supplied is increased as compared to a case where variation of the differential pressure is small. Therefore, there are concerns about cost increase caused by, for example, an increase in the size of a fluid supply pump, and about aggregation of components contained in the fluid due to pressure when pumping the fluid with a large flow rate by the pump.

Therefore, the pressure loss in the channel in the liquid supply member 330 is designed to be smaller than the total pressure loss in the channels in the supply system side channel member 240, the substrate side channel member 220, and the printing element substrate 210 illustrated in FIG. 18. Specifically, it is preferable that the pressure loss is designed to be equal to or less than the total pressure loss, and it is more preferable that the pressure loss is designed to be equal to or less than a half of the total pressure loss.

Under this condition, even in a case where the differential pressure across each of the printing element substrates 210 fluctuates among the printing element substrates 210 illustrated in FIGS. 15A and 15B because of difference in the channel length and the cross-section area illustrated in FIG. 24, the pressure losses in the channels in the supply system side channel member 240, the substrate side channel member 220, and the printing element substrate 210 are dominant. Therefore, it is possible to sufficiently reduce the flow rate fluctuation in the fluid circulating through the printing element substrates 210 in FIGS. 15A and 15B, and the above-described problem is unlikely to occur.

Note that, the total pressure loss in the channels in the supply system side channel member 240 and the substrate side channel member 220 are small enough to be ignored as compared to the pressure loss in the channel in the printing element substrate 210. Accordingly, in a case where the pressure loss in the channel in the liquid supply member 330 is a half of the pressure loss in the channel in the printing element substrate 210, the pressure loss in the channel in the liquid supply member 330 is substantially a half of the total pressure loss in the channels in the supply system side channel member 240, the substrate side channel member 220, and the printing element substrate 210. Therefore, essentially, it is preferable that the pressure loss in the channel in the liquid supply member 330 be designed to be sufficiently smaller than the total pressure loss in the channel in the printing element substrate 210. Specifically, it is preferable that the pressure loss in the channel in the liquid supply member 330 be designed to be equal to or less than one-fifth of the total pressure loss in the channel in the printing element substrate 210, and it is more preferable that the pressure loss in the channel in the liquid supply member 330 be designed to be equal to or less than one-tenth of the total pressure loss in the channel in the printing element substrate 210.

A channel configuration of the liquid ejection head including the four printing element substrates is described so far. As illustrated in FIG. 27, it is possible to allocate a pair of the series configuration distribution channel and the parallel configuration collection channel to the two printing element substrates out of the four printing element substrates and to allocate a pair of the parallel configuration distribution channel and the series configuration collection channel to the other two printing element substrates.

Figure 28A:
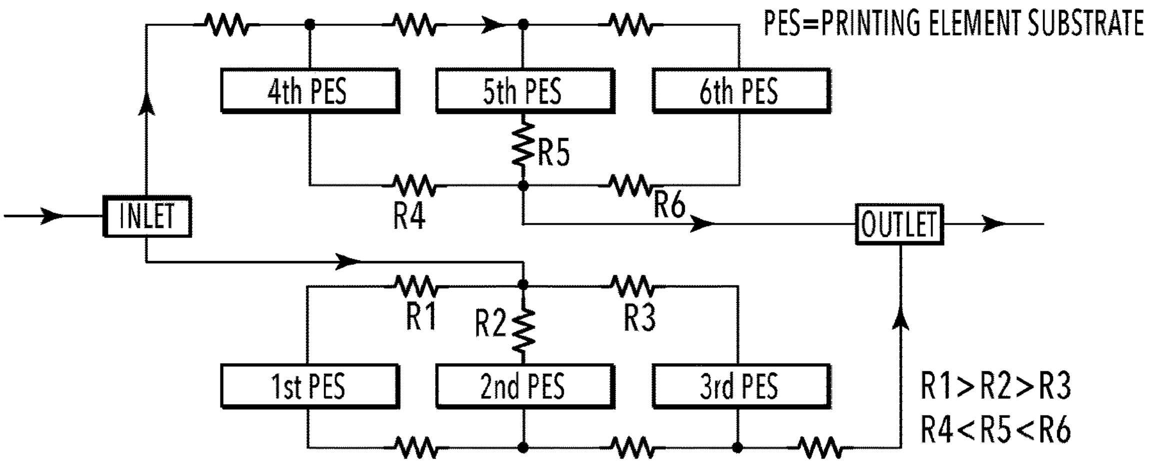
FIGS. 28A to 28C are conceptual views of channel configurations in the head including the three or more printing element substrates arranged in a staggered manner according to the first embodiment.
Figure 28B:
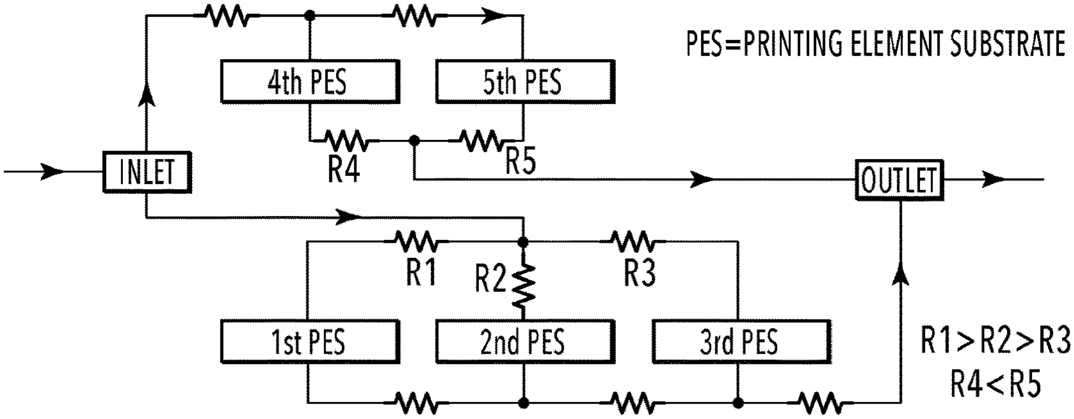
Figure 28C:
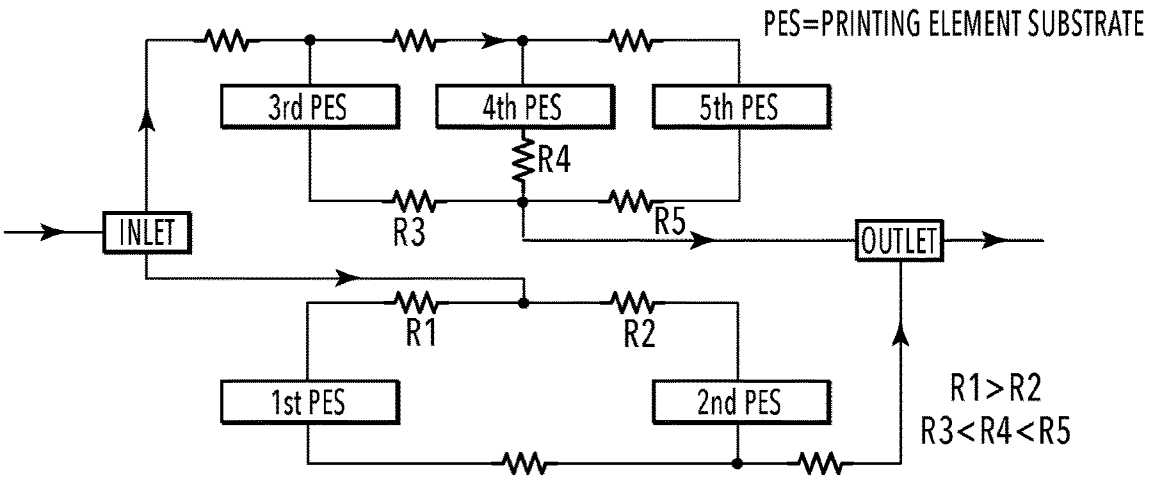

However, in practice, it is also possible to use a similar channel configuration for three or more printing elements. For example, FIG. 28A illustrates a conceptual view of a channel in the liquid ejection head including six printing element substrates. In the configuration illustrated in FIG. 28A, a pair of the series configuration distribution channel and the parallel configuration collection channel is allocated to three printing element substrates out of the six printing element substrates, and a pair of the parallel configuration distribution channel and the series configuration collection channel is allocated to the other three printing element substrates. The fluid flowing from an inlet branches into two directions. The one fluid passes through the parallel configuration distribution channel and is supplied to the first printing element substrate, the second printing element substrate, and the third printing element substrate, circulates through the printing element substrates, and then passes through the series configuration collection channel to flow out of the outlet. The other fluid passes through the series configuration distribution channel and is supplied to the fourth printing element substrate, the fifth printing element substrate, and the sixth printing element substrate. The fluid that circulates through the printing element substrates passes through the parallel configuration collection channel and flows out of the outlet. In this case, R (a resistance in the channel), corresponding to each of the printing element substrates, is provided in the distribution channel or the collection channel of the parallel configuration. With this, the pressure difference that occurs between the printing element substrates due to the positional relationship between upstream and downstream in the series configuration channel (the supply channel or the collection channel) is adjusted in the parallel configuration channel (the collection channel or the supply channel), and the average pressures in the printing element substrates are equalized. In a case of FIG. 28A, it is preferable to adjust resistances R1 to R6 so that $R1>R2>R3$ and $R4<R5<R6$ are satisfied. In this way, for a head including an odd number (2n) of the printing element substrates for each printing head, it is preferable to adjust resistances R1 to R2n so that $R1>R2> \ldots >Rn$, and $Rn<Rn+2< \ldots <R2n-1$ are satisfied. Note that R1 to Rn are for a case in which the supply channel has the parallel configuration. R1, R2, R3 ($R1>R2>R3$) in the lower pair in FIG. 28A is a specific example thereof. Additionally, Rn to R2n are for a case in which the supply channel has the series configuration. R4, R5, R6 ($R4<R5<R6$) in the upper pair in FIG. 28A is a specific example thereof. Likewise, for a head including an odd number (2n−1) of the printing element substrates for each printing head, it is preferable to adjust resistances R1 to R2n−1 so that $R1>R2> \ldots >Rn$, and $Rn+1<Rn+2< \ldots <R2n-1$ are satisfied. Note that R1 to Rn are for a case in which the supply channel has the parallel configuration. R1, R2, R3 ($R1>R2>R3$) in the lower pair in FIG. 28B is a specific example thereof. Additionally, Rn+1 to R2n−1 are for a case in which the supply channel has the series configuration. R4, R5 ($R4<R5$) in the upper pair in FIG. 28B is a specific example thereof. In addition, for a head including an odd number (2n−1) of the printing element substrates for each printing head, it is also preferable to adjust resistances R1 to R2n−1 so that $R1>R2> \ldots >Rn-1$, and $Rn<Rn+1< \ldots <R2n-1$ are satisfied. Note that, R1 to Rn−1 are for a case in which the supply channel has the parallel configuration. R1, R2 ($R1>R2$) in the lower pair in FIG. 28C is a specific example thereof. Additionally, Rn to R2n−1 are for a case in which the supply channel has the series configuration. R3, R4, R5 ($R3<R4<R5$) in the upper pair in FIG. 28C is a specific example thereof.

Figure 29A:
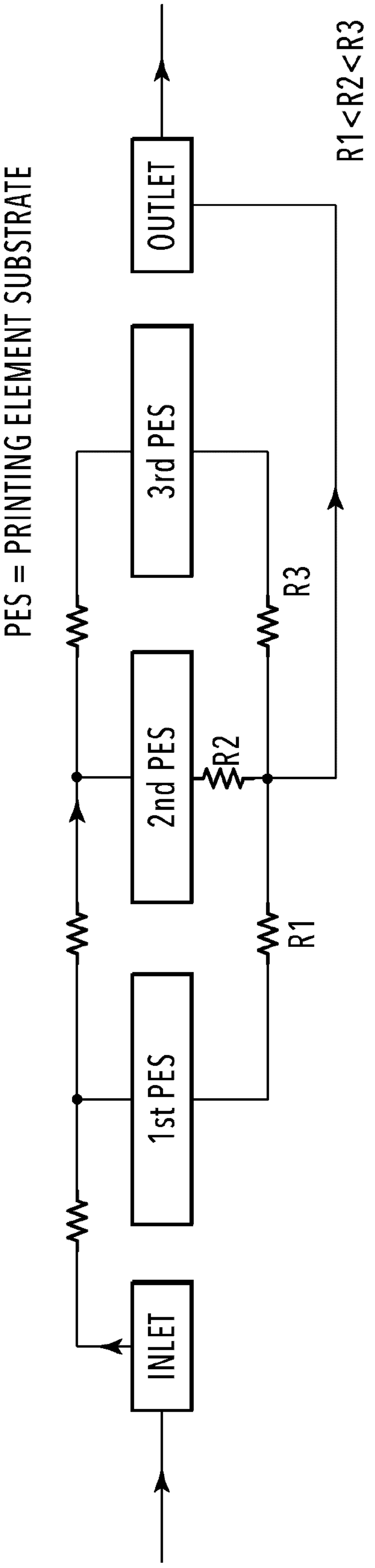
FIGS. 29A and 29B are conceptual views of a channel configurations in a head including printing element substrates in two or more types of arrangement according to the first embodiment.
Figure 29B:
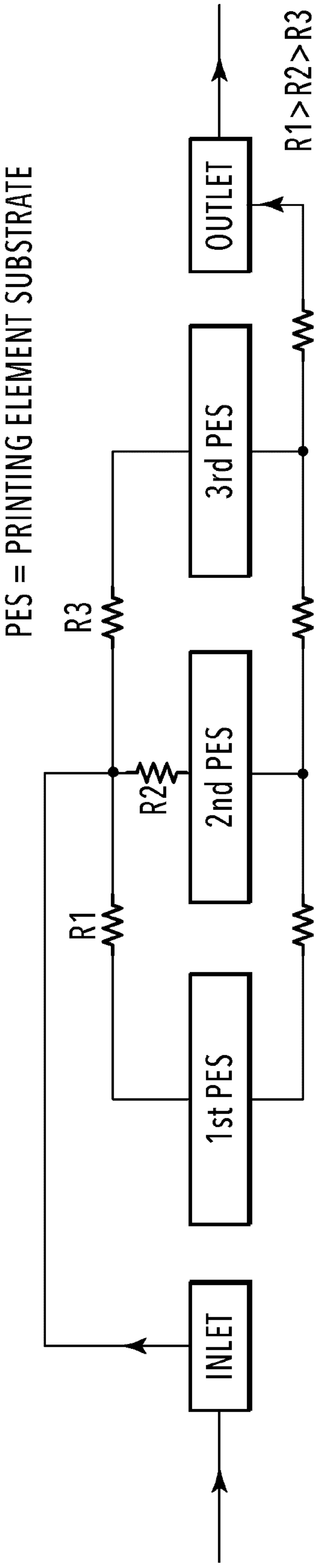

Additionally, for example, as illustrated in FIG. 29A, a pair of the series configuration distribution channel and the parallel configuration collection channel may be allocated to an inline head in which three printing element substrates are arrayed. Alternatively, as illustrated in FIG. 29B, a pair of the parallel configuration distribution channel and the series configuration collection channel may be allocated to the inline head in which three printing element substrates are arrayed. Additionally, as illustrated in FIGS. 29A and 29B, in the configuration in FIG. 29A, any configuration is applicable as long as the relationship of $R1>R2>R3$ is satisfied, and in the configuration in FIG. 29B, any configuration is applicable as long as the relationship of $R1<R2<R3$ is satisfied.

That is, any configuration is applicable as long as one or more pairs that are selected from a pair of the series configuration distribution channel and the parallel configuration collection channel and a pair of the parallel configuration distribution channel and the series configuration collection channel are applied in accordance with the number of the printing element substrates used in the liquid ejection head.

Although the liquid supply member 330, the main support member 310, the supply system side channel member 240, the substrate side channel member 220, and the printing element substrate 210 are described as separated members so far, a part of or all of the members may be formed as a unified member. Additionally, it is possible to apply the above-described embodiment not only to a page-wide head but also to a so-called series head that performs scanning by itself to perform printing.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-207132, filed on Dec. 23, 2022, which is hereby incorporated by reference herein in its entirety.

What is claimed is:

1. A liquid ejection head, comprising:

a first printing element substrate that includes:

- a plurality of first ejection ports that eject liquid,
- a plurality of first pressure chambers that are provided to correspond to the plurality of first ejection ports, respectively, and that are configured to be able to eject the liquid,
- a supply channel that is configured to supply the plurality of first pressure chambers with the liquid and that includes a first supply opening provided upstream with respect to a liquid flow direction, and
- a gathering channel that is configured to gather the liquid from the plurality of first pressure chambers and that includes a first gathering opening provided downstream with respect to the liquid flow direction;

a second printing element substrate that includes:

- a plurality of second ejection ports that eject the liquid,
- a plurality of second pressure chambers that are provided to correspond to the plurality of second ejection ports, respectively, and that are configured to be able to eject the liquid,
- a supply channel that is configured to supply the plurality of second pressure chambers with the liquid and that includes a second supply opening provided upstream with respect to the liquid flow direction, and
- a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively, and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows out, wherein in the distribution channel, the first distribution opening and the second distribution opening are arranged in series manner so as to be arrayed in the order as listed from the inlet opening, in the collection channel, the first collection opening and the second collection opening are arranged parallel to each other so as to be connected with the outlet opening by way of a branch point, in the collection channel, a flow resistance between the first collection opening and the branch point is lower than a flow resistance between the second collection opening and the branch point, and a fluctuation of pressures in the plurality of first pressure chambers included in the first printing element substrate and the plurality of second pressure chambers included in the second printing element substrate is within 93 mmAq.

2. A liquid ejection head comprising:

a first printing element substrate that includes:

a plurality of first ejection ports that eject liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively, and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows out, wherein in the distribution channel, the first distribution opening and the second distribution opening are arranged in series manner so as to be arrayed in the order as listed from the inlet opening, in the collection channel, the first collection opening and the second collection opening are arranged parallel to each other so as to be connected with the outlet opening by way of a branch point, in the collection channel, a flow resistance between the first collection opening and the branch point is lower than a flow resistance between the second collection opening and the branch point, and in both the distribution channel and collection channel, a pressure loss due to a flow rate of the liquid ejected from the plurality of first pressure chambers and the plurality of second pressure chambers is within a range of an allowable negative pressure range that allows for normal ejection.

3. The liquid ejection head according to claim 2, wherein the pressure loss is equal to or less than 130 mmAq.

4. The liquid ejection head according to claim 3, wherein the pressure loss is equal to or less than 65 mmAq.

5. A liquid ejection head comprising:

a first printing element substrate that includes:

a plurality of first ejection ports that eject liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively, and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows out, wherein in the distribution channel, the first distribution opening and the second distribution opening are arranged in series manner so as to be arrayed in the order as listed from the inlet opening, in the collection channel, the first collection opening and the second collection opening are arranged parallel to each other so as to be connected with the outlet opening by way of a branch point, in the collection channel, a flow resistance between the first collection opening and the branch point is lower than a flow resistance between the second collection opening and the branch point, and a sum of flow resistances in the distribution channel and the collection channel due to a flow rate of the liquid ejected from the plurality of first pressure chambers included in the first printing element substrate and a sum of flow resistances in the distribution channel and the collection channel due to a flow rate of the liquid ejected from the plurality of second pressure chambers included in the second printing element substrate are both equal to or less than 0.36 mmAq/(ml/min)/cP.

6. The liquid ejection head according to claim 1, wherein a sum of pressure losses in the distribution channel and the collection channel related to one printing element substrate is equal to or less than a sum of pressure losses in the supply channel and the gathering channel included in the one printing element substrate.

7. The liquid ejection head according to claim 6, wherein the sum of the pressure losses in the distribution channel and the collection channel related to the one printing element substrate is equal to or less than half the sum of the pressure losses in the supply channel and the gathering channel included in the one printing element substrate.

8. A liquid ejection head, comprising:

a first printing element substrate that includes:

a plurality of first ejection ports that eject a liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively; and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows, wherein in the collection channel, the first collection opening and the second collection opening are arranged in series manner so as to be arrayed in the order as listed toward the outlet opening, in the distribution channel, the first distribution opening and the second distribution opening are arranged parallel to each other so as to be connected with the inlet opening by way of a branch point, in the distribution channel, a flow resistance between the branch point and the first distribution opening is greater than a flow resistance between the branch point and the second distribution opening, and a fluctuation of pressures in the plurality of first pressure chambers included in the first printing element substrate and the plurality of second pressure chambers included in the second printing element substrate is within 93 mmAq.

9. A liquid ejection head comprising:

a first printing element substrate that includes:

a plurality of first ejection ports that eject a liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively; and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows, wherein in the collection channel, the first collection opening and the second collection opening are arranged in series manner so as to be arrayed in the order as listed toward the outlet opening, in the distribution channel, the first distribution opening and the second distribution opening are arranged parallel to each other so as to be connected with the inlet opening by way of a branch point, in the distribution channel, a flow resistance between the branch point and the first distribution opening is higher than a flow resistance between the branch point and the second distribution opening, and in both the distribution channel and collection channel, a pressure loss due to a flow rate of the liquid ejected from the plurality of first pressure chambers and the plurality of second pressure chambers is within a range of an allowable negative pressure range that allows for normal ejection.

10. The liquid ejection head according to claim 9, wherein the pressure loss is equal to or less than 130 mmAq.

11. The liquid ejection head according to claim 10, wherein the pressure loss is equal to or less than 65 mmAq.

12. A liquid ejection head comprising:

a first printing element substrate that includes:

a plurality of first ejection ports that eject a liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction; and a liquid supply member that includes:

a distribution channel that is arranged upstream with respect to the first printing element substrate and the second printing element substrate and that includes an inlet opening into which the liquid flows and a first distribution opening and a second distribution opening that distribute the liquid flowing from the inlet opening to the first supply opening and the second supply opening, respectively; and a collection channel that is arranged downstream with respect to the first printing element substrate and the second printing element substrate and that includes a first collection opening and a second collection opening that collect the liquid from the first gathering opening and the second gathering opening, respectively, and an outlet opening from which the liquid collected from the first collection opening and the second collection opening flows, wherein in the collection channel, the first collection opening and the second collection opening are arranged in series manner so as to be arrayed in the order as listed toward the outlet opening, in the distribution channel, the first distribution opening and the second distribution opening are arranged parallel to each other so as to be connected with the inlet opening by way of a branch point, in the distribution channel, a flow resistance between the branch point and the first distribution opening is higher than a flow resistance between the branch point and the second distribution opening, and a sum of flow resistances in the distribution channel and the collection channel due to a flow rate of the liquid ejected from the plurality of first pressure chambers included in the first printing element substrate and a sum of flow resistances in the distribution channel and the collection channel due to a flow rate of the liquid ejected from the plurality of second pressure chambers included in the second printing element substrate are both equal to or less than 0.36 mmAq/(ml/min)/cP.

13. The liquid ejection head according to claim 8, wherein a sum of pressure losses in the distribution channel and the collection channel related to one printing element substrate is equal to or less than a sum of pressure losses in the supply channel and the gathering channel included in the one printing element substrate.

14. The liquid ejection head according to claim 13, wherein the sum of the pressure losses in the distribution channel and the collection channel related to the one printing element substrate is equal to or less than half the sum of the pressure losses in the supply channel and the gathering channel included in the one printing element substrate.

15. A liquid ejection head, comprising:

a first printing element substrate that includes:

a plurality of first ejection ports that eject a liquid, a plurality of first pressure chambers that are provided to correspond to the plurality of first ejection ports, respectively, and that are configured to be able to eject the liquid, a supply channel that is configured to supply the plurality of first pressure chambers with the liquid and that includes a first supply opening provided upstream with respect to a liquid flow direction, and a gathering channel that is configured to gather the liquid from the plurality of first pressure chambers and that includes a first gathering opening provided downstream with respect to the liquid flow direction;

a second printing element substrate that includes:

a plurality of second ejection ports that eject the liquid, a plurality of second pressure chambers that are provided to correspond to the plurality of second ejection ports, respectively, and that are configured to be able to eject the liquid, a supply channel that is configured to supply the plurality of second pressure chambers with the liquid and that includes a second supply opening provided upstream with respect to the liquid flow direction, and a gathering channel that is configured to gather the liquid from the plurality of second pressure chambers and that includes a second gathering opening provided downstream with respect to the liquid flow direction;

a third printing element substrate that includes:

a plurality of third ejection ports that eject a liquid, a plurality of third pressure chambers that are provided to correspond to the plurality of third ejection ports, respectively, and that are configured to be able to eject the liquid, a supply channel that is configured to supply the plurality of third pressure chambers with the liquid and that includes a third supply opening provided upstream with respect to a liquid flow direction, and a gathering channel that is configured to gather the liquid from the plurality of third pressure chambers and that includes a third gathering opening provided downstream with respect to the liquid flow direction;

a fourth printing element substrate that includes:

a plurality of fourth ejection ports that eject the liquid, a plurality of fourth pressure chambers that are provided to correspond to the plurality of fourth ejection ports, respectively, and that are configured to be able to eject the liquid, a supply channel that is configured to supply the plurality of fourth pressure chambers with the liquid and that includes a fourth supply opening provided upstream with respect to the liquid flow direction, and a gathering channel that is configured to gather the liquid from the plurality of fourth pressure chambers and that includes a fourth gathering opening provided downstream with respect to the liquid flow direction; and a liquid supply member that includes:

a first distribution channel that is arranged upstream with respect to the first printing element substrate and the second printing element substrate and that includes a first inlet opening into which the liquid flows and a first distribution opening and a second distribution opening that distribute the liquid flowing from the first inlet opening to the first supply opening and the second supply opening, respectively, a first collection channel that is arranged downstream with respect to the first printing element substrate and the second printing element substrate and that includes a first collection opening and a second collection opening that collect the liquid from the first gathering opening and the second gathering opening, respectively, and a first outlet opening from which the liquid collected from the first collection opening and the second collection opening flows, a second distribution channel that is arranged upstream with respect to the third printing element substrate and the fourth printing element substrate and that includes a second inlet opening into which the liquid flows and a third distribution opening and a fourth distribution opening that distribute the liquid flowing from the second inlet opening to the third supply opening and the fourth supply opening, respectively, and a second collection channel that is arranged downstream with respect to the third printing element substrate and the fourth printing element substrate and that includes a third collection opening and a fourth collection opening that collect the liquid from the third gathering opening and the fourth gathering opening, respectively, and a second outlet opening from which the liquid collected from the third collection opening and the fourth collection opening flows, the first inlet opening and the second inlet opening being the same opening, and the first outlet opening and the second outlet opening being the same opening, wherein in the first distribution channel, the first distribution opening and the second distribution opening are arranged in series manner so as to be arrayed in the order as listed from the first inlet opening, in the first collection channel, the first collection opening and the second collection opening are arranged parallel to each other so as to be connected with the first outlet opening by way of a first branch point, in the first collection channel, a flow resistance between the first collection opening and the first branch point is lower than a flow resistance between the second collection opening and the first branch point, in the second collection channel, the third collection opening and the fourth collection opening are arranged in series manner so as to be arrayed in the order as listed toward the second outlet opening, in the second distribution channel, the third distribution opening and the fourth distribution opening are arranged parallel to each other so as to be connected with the second inlet opening by way of a second branch point, and in the second distribution channel, a flow resistance between the second branch point and the third distribution opening is higher than a flow resistance between the second branch point and the fourth distribution opening.

* * * * *